(12) United States Patent
Kumar

(10) Patent No.: US 11,391,891 B2
(45) Date of Patent: Jul. 19, 2022

(54) FABRICATION METHOD FOR PHOTONIC DEVICES

(71) Applicant: PsiQuantum, Corp., Palo Alto, CA (US)

(72) Inventor: Nikhil Kumar, Palo Alto, CA (US)

(73) Assignee: PsiQuantum, Corp., Palo Alto, CA (US)

( * ) Notice: Subject to any disclaimer, the term of this patent is extended or adjusted under 35 U.S.C. 154(b) by 0 days.

(21) Appl. No.: 17/189,050

(22) Filed: Mar. 1, 2021

(65) Prior Publication Data

US 2021/0278595 A1   Sep. 9, 2021

Related U.S. Application Data

(60) Provisional application No. 62/984,759, filed on Mar. 3, 2020.

(51) Int. Cl.
*G02B 6/293* (2006.01)
*G02B 6/036* (2006.01)
(Continued)

(52) U.S. Cl.
CPC ........... *G02B 6/2935* (2013.01); *G02B 6/036* (2013.01); *G02B 6/132* (2013.01); *G02B 2006/12145* (2013.01); *G02B 2006/12176* (2013.01)

(58) Field of Classification Search
CPC ...... G02B 6/2935; G02B 6/036; G02B 6/132; G02B 2006/12145; G02B 2006/12176
(Continued)

(56) References Cited

U.S. PATENT DOCUMENTS 4,801,557 A   1/1989   Wessels et al.
5,064,684 A   12/1991  Mir et al.
(Continued)

FOREIGN PATENT DOCUMENTS

CN   100371766 C   2/2008
CN   205942163 U   2/2017
(Continued)

OTHER PUBLICATIONS

Office Action in Tawain Patent Application No. 110107412 dated Dec. 29, 2021, 20 pgs.
(Continued)

*Primary Examiner* — Jerry M Blevins
(74) *Attorney, Agent, or Firm* — Kowert, Hood, Munyon, Rankin & Goetzel, P.C.

(57) ABSTRACT

Electro-optical devices and methods for constructing electro-optical devices such as a switch or phase shifter. An electrode layer is deposited on a substrate layer, a waveguide structure is deposited on the electrode layer, a first cladding layer is deposited on the waveguide structure, and the first cladding layer is planarized and bonded to a wafer. The substrate layer is removed and the electrode layer is etched to split the electrode layer into a first electrode separated from a second electrode. A second cladding layer is deposited on the etched electrode layer. The first and second electrodes may be composed of a material with a large dielectric constant, or they may be composed of a material with a large electron mobility. The device may exhibit a sandwich waveguide architecture where an electro-optic layer is disposed between two strip waveguides.

20 Claims, 25 Drawing Sheets

(51) Int. Cl.
*G02B 6/132* (2006.01)
*G02B 6/12* (2006.01)

(58) Field of Classification Search
USPC .............................................................. 385/2
See application file for complete search history.

(56) References Cited

U.S. PATENT DOCUMENTS

| | | | |
|---|---|---|---|
| 5,185,317 | A | 2/1993 | Wessels et al. |
| 5,270,298 | A | 12/1993 | Ramesh |
| 5,296,460 | A | 3/1994 | Wessels et al. |
| 5,442,585 | A | 8/1995 | Eguchi et al. |
| 5,663,556 | A | 9/1997 | Wessels et al. |
| 5,731,220 | A | 3/1998 | Tsu et al. |
| 5,753,300 | A | 5/1998 | Wessels et al. |
| 5,911,018 | A | 6/1999 | Bischel et al. |
| 6,112,429 | A | 9/2000 | Wessels et al. |
| 6,118,571 | A | 9/2000 | Wessels et al. |
| 6,122,429 | A | 9/2000 | Wessels et al. |
| 6,208,453 | B1 | 3/2001 | Wessels et al. |
| 6,303,393 | B1 | 10/2001 | Wessels et al. |
| 6,477,285 | B1 | 11/2002 | Shanley |
| 6,493,497 | B1 | 12/2002 | Ramdani et al. |
| 6,585,424 | B2 | 7/2003 | Chason et al. |
| 6,594,414 | B2 | 7/2003 | Tungare et al. |
| 6,684,007 | B2 * | 1/2004 | Yoshimura ............... G02B 6/43 257/E25.032 |
| 7,020,374 | B2 | 3/2006 | Talin et al. |
| 7,224,869 | B2 | 5/2007 | Cole et al. |
| 7,224,878 | B1 | 5/2007 | Wessels et al. |
| 7,283,689 | B1 | 10/2007 | Block et al. |
| 7,421,179 | B1 | 9/2008 | Jiang et al. |
| 7,426,326 | B2 | 9/2008 | Moeller et al. |
| 9,494,734 | B1 | 11/2016 | Jain et al. |
| 9,535,308 | B2 | 1/2017 | Li et al. |
| 9,664,931 | B1 | 5/2017 | Yap et al. |
| 10,163,825 | B1 | 12/2018 | Liao et al. |
| 10,247,999 | B1 | 4/2019 | Yap et al. |
| 10,627,696 | B1 | 4/2020 | Chang et al. |
| 10,770,414 | B2 | 9/2020 | Liao et al. |
| 2002/0028045 | A1 | 3/2002 | Yoshimura et al. |
| 2002/0181825 | A1 | 12/2002 | Johnson et al. |
| 2003/0015712 | A1 | 1/2003 | Vieira et al. |
| 2003/0017625 | A1 | 1/2003 | Litvin |
| 2005/0201686 | A1 | 9/2005 | Cole et al. |
| 2007/0165997 | A1 | 7/2007 | Suzuki et al. |
| 2008/0089633 | A1 | 4/2008 | Moeller et al. |
| 2009/0231686 | A1 | 9/2009 | Atkins et al. |
| 2010/0002994 | A1 | 1/2010 | Baehr-Jones et al. |
| 2010/0290732 | A1 | 11/2010 | Gill |
| 2012/0155824 | A1 | 6/2012 | Suzuki et al. |
| 2015/0086219 | A1 | 3/2015 | Li et al. |
| 2016/0291350 | A1 | 10/2016 | Fukikata et al. |
| 2016/0313579 | A1 | 10/2016 | Yokoyama et al. |
| 2016/0349546 | A1 | 12/2016 | Abel et al. |
| 2018/0011347 | A1 | 1/2018 | Ishikura |
| 2018/0373067 | A1 | 12/2018 | Fukikata |
| 2019/0173190 | A1 | 6/2019 | Johnson et al. |
| 2019/0244866 | A1 * | 8/2019 | Zilkie ............. H01L 21/823821 |
| 2019/0384073 | A1 | 12/2019 | Yu et al. |
| 2019/0393171 | A1 | 12/2019 | Liao et al. |
| 2020/0301238 | A1 | 9/2020 | Chang et al. |
| 2020/0381377 | A1 | 12/2020 | Liao et al. |
| 2021/0066219 | A1 | 3/2021 | Chen et al. |
| 2021/0231876 | A1 | 7/2021 | Kumar |

FOREIGN PATENT DOCUMENTS

| | | |
|---|---|---|
| CN | 107430297 A | 12/2017 |
| CN | 109387820 A | 2/2019 |
| EP | 0782017 A2 | 7/1997 |
| TW | 200839330 A | 10/2008 |
| WO | 2007065447 A1 | 6/2007 |

OTHER PUBLICATIONS

Notice of Allowance in U.S. Appl. No. 17/160,133, dated Nov. 29, 2021, 13 pgs.
Alexander, K., et al., "Nanophotonic Pockels modulators on a silicon nitride platform", Photonics Research Group, INTEC Department, Ghent University-imec, Ghent B-9000, Belgium Liquid Crystals and Photonics Group, ELIS Department, Ghent University, Ghent B-9000, Belgium IDLab, INTEC Department, Ghent Universily-imec, Ghent B-9000, Belgium Center for Nano- and Biophotonics (NB-Photonics), Ghent University, Ghent B-9000, Belgium, dated: Jun. 14, 2018, 11 pgs.
International Search Report and Written Opinion of International Application No. PCT/US2021/015294, dated May 10, 2021, 14 pgs.
Interational Search Report and Written Opinion for International Application No. PCT/US2021/020337, dated Jun. 25, 2021, 12 pgs.
Elliott Ortmann J et al: "Ultra-Low-Power Tuning in Hybrid Barium Titanate-Silicon Nitride Electro-Optic Devices on Silicon", arxiv. org, Cornell University Library, 201 Olin Library Cornell University Ithaca, NY 14853, Nov. 26, 2019, 8 pgs.
Felix El Tes et al: "A BaTi03-Based Electro-Optic Pockels Modulator Monolithically Integrated on an Advanced Silicon Photonics Platform", arxiv.org, Cornell University Library, 201 Olin Library Cornell University Ithaca NY 14853, Nov. 6, 2019, 7 pgs.
El Tes F et al: "First cryogenic electro-optic switch on silicon with high bandwidth and low power tunability," 2018 IEEE International Electron Devices Meeting (IEDM), IEEE, Dec. 1, 2018, 4 pgs.
International Search Report and Written Opinion for International Application No. PCT/US2021/020330, dated Jun. 2, 2021, 12 pgs.
International Search Report and Written Opinion for International Application No. PCT/US2021/020341, dated Jun. 25, 2021, 12 pgs.
U.S. Appl. No. 17/160,133, filed Jan. 27, 2001, Nikhil Kumar.
U.S. Appl. No. 17/189,032, filed Mar. 1, 2001, Nikhil Kumar.
U.S. Appl. No. 17/189,025, filed Mar. 1, 2001, Nikhil Kumar.

* cited by examiner

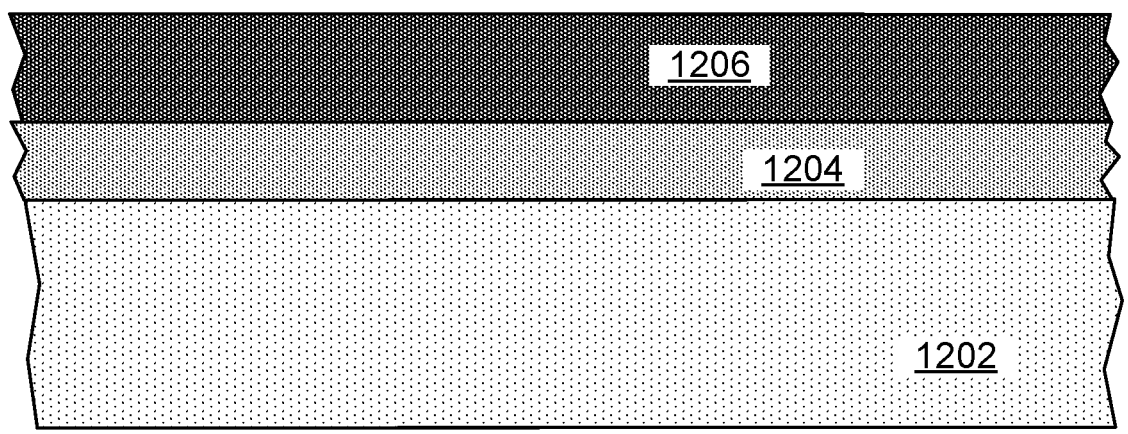
FIG. 12a
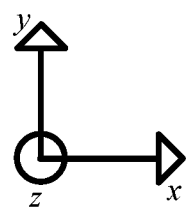

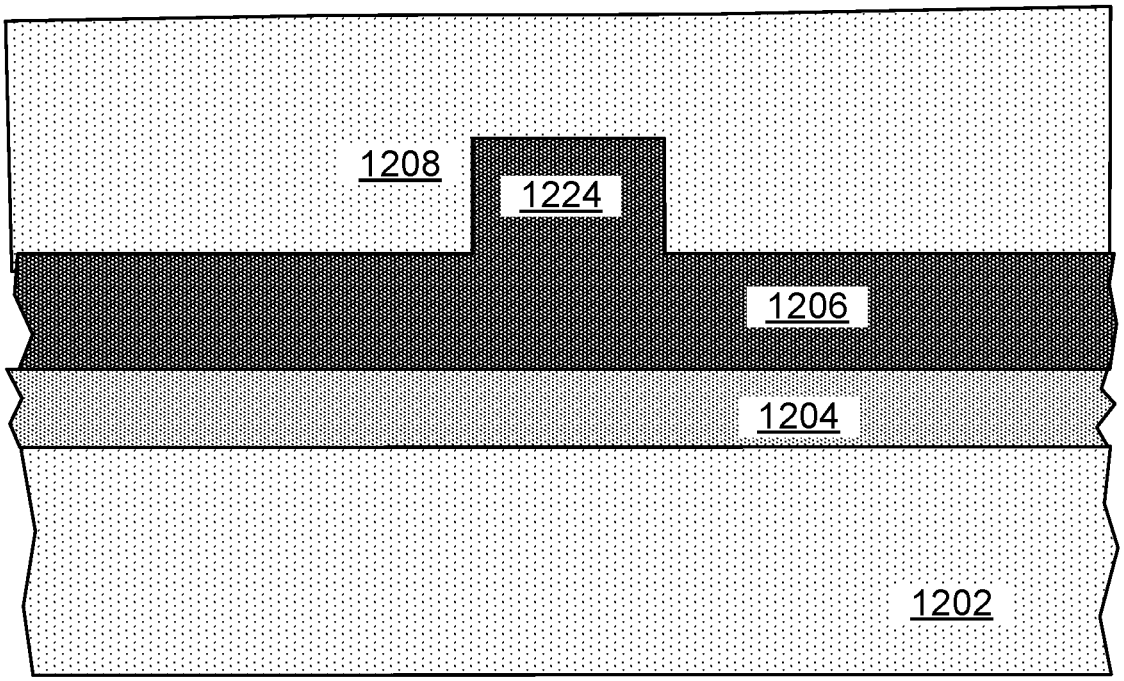
*FIG. 12b*
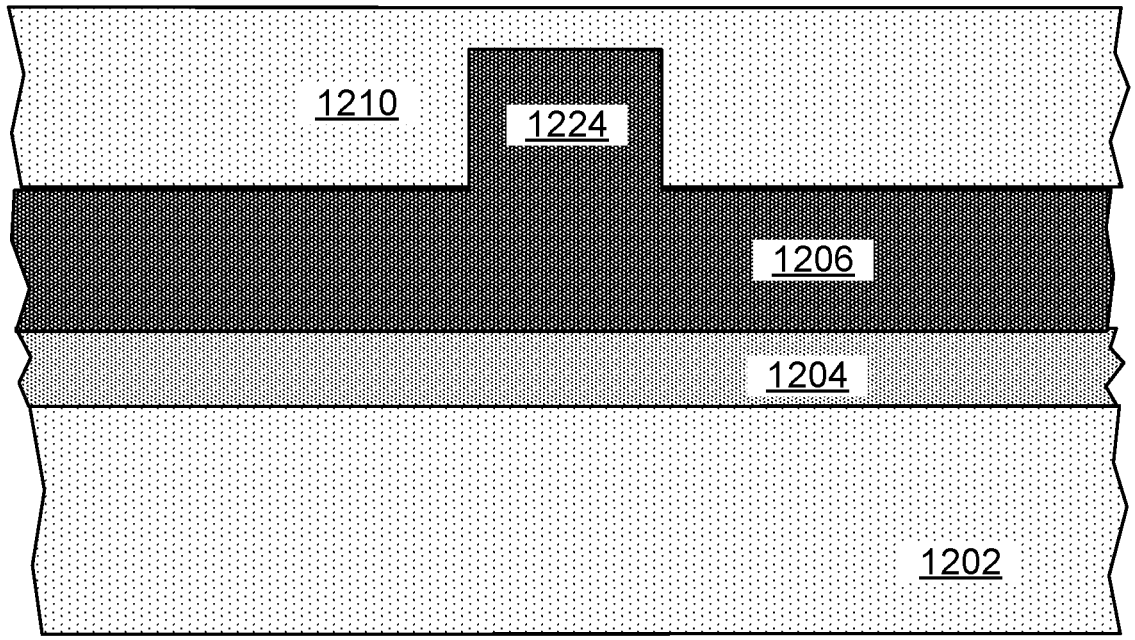
*FIG. 12c*
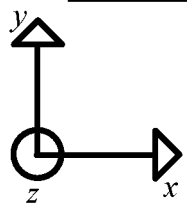

FABRICATION METHOD FOR PHOTONIC DEVICES

PRIORITY CLAIM

This application claims priority to U.S. Provisional Patent Application No. 62/984,759, titled "FABRICATION METHOD FOR PHOTONIC DEVICES" and filed on Mar. 3, 2020, which is hereby incorporated by reference in its entirety, as though fully and completely set forth herein.

TECHNICAL FIELD

Embodiments herein relate generally to fabricating electro-optic devices such as phase shifters and switches.

BACKGROUND

Electro-optic (EO) modulators and switches have been used in optical fields. Some EO modulators utilize free-carrier electro-refraction, free-carrier electro-absorption, the Pockel's effect, or the DC Kerr effect to modify optical properties during operation, for example, to change the phase of light propagating through the EO modulator or switch. As an example, optical phase modulators can be used in integrated optics systems, waveguide structures, and integrated optoelectronics.

Despite the progress made in the field of EO modulators and switches, there is a need in the art for improved methods and systems related to fabrication and architectures for EO modulators and switches.

SUMMARY

Some embodiments described herein relate to photonic devices and methods for fabricating photonic devices such as electro-optical switches and phase shifters.

In some embodiments, a device includes a first cladding layer, a first electrode, a second electrode, a waveguide structure comprising a first material, and a second cladding layer. The waveguide structure is coupled to the first electrode and the second electrode. In some embodiments, the first electrode and the second electrode are composed of a second material with an electron mobility higher than silicon.

In some embodiments, a device includes a first cladding layer, a first electrode, a second electrode, a second cladding layer, and a waveguide structure. The waveguide structure may include an electro-optic layer composed of a first material, a first strip waveguide portion composed of a second material, and a second strip waveguide portion composed of a third material. The electro-optic layer may be disposed between the first strip waveguide portion and the second strip waveguide portion. The electro-optic layer may be coupled to the first electrode and the second electrode.

In some embodiments, a method is described for fabricating a device.

For example, in some embodiments, a seed layer is deposited on a substrate layer, an electro-optic layer is deposited on the seed layer, a first cladding layer is deposited on the electro-optic layer. In some embodiments, a pre-fabricated first wafer comprising the stacked substrate layer, seed layer, electro-optic layer, and/or first cladding layer may be received as a starting point for further fabrication steps.

In some embodiments the first cladding layer is planarized and bonded to a second wafer. The substrate layer is removed and the seed layer is etched to split the seed layer into a first electrode separated from a second electrode. A second cladding layer is deposited on the etched seed layer. In some embodiments, the second cladding layer is etched to expose a first portion of the first electrode and a second portion of the second electrode. A first lead is deposited onto the first electrode through the exposed first portion and a second lead is deposited onto the second electrode through the exposed second portion.

In some embodiments, a seed layer is deposited on a substrate layer, an electro-optic layer is deposited on the seed layer, and an electrode layer is deposited on the electro-optic layer. In some embodiments, a pre-fabricated first wafer comprising the stacked substrate layer, seed layer, electro-optic layer, and/or electrode layer may be received as a starting point for further fabrication steps.

In some embodiments, the electrode layer is etched to expose a portion of the electro-optic layer and split the electrode layer into a first electrode separated from a second electrode. A first cladding layer is deposited on the exposed portion of the electro-optic layer and the first and second electrodes. The first cladding layer is planarized and bonded to a second wafer. The substrate layer and the seed layer are removed, and after removing the substrate layer and the seed layer, the electro-optic layer is etched to produce a ridge waveguide with a first thickness disposed between first and second slab layers with a second thickness smaller than the first thickness. A second cladding layer is deposited on the first and second slab layers and the ridge waveguide structure.

In some embodiments, a seed layer is deposited on a substrate layer, an electro-optic layer is deposited on the seed layer, and a first cladding layer is deposited on the electro-optic layer. In some embodiments, a pre-fabricated first wafer comprising the stacked substrate layer, seed layer, electro-optic layer, and/or first cladding layer may be received as a starting point for further fabrication steps.

In some embodiments, the first cladding layer is planarized and bonded to a wafer. The substrate layer and the seed layer are removed, and after removing the substrate layer and the seed layer, the electro-optic layer is etched to produce a ridge waveguide with a first thickness disposed between a first slab layer and a second slab layer, wherein the first and second slab layers have a second thickness smaller than the first thickness. First and second electrodes are deposited on the left and right sides, respectively, of the ridge waveguide structure. A second cladding layer is then deposited on the first and second electrodes and the ridge waveguide structure.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures.

FIGS. 12A-G are schematic diagrams illustrating a fabrication method for constructing the electro-optical device with a ridge waveguide positioned opposite to the electrodes, according to some embodiments;

Figure 1:
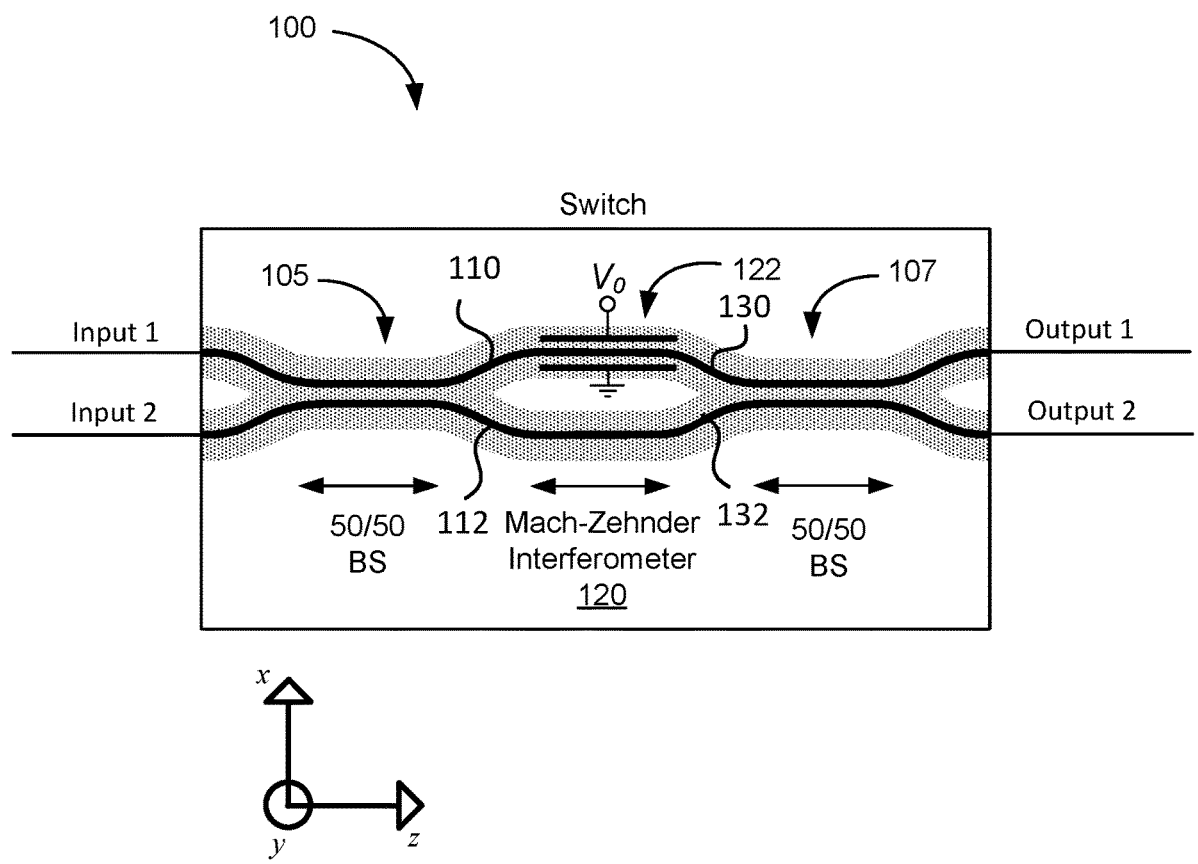
FIG. 1 is a simplified schematic diagram illustrating an optical switch according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electrode layer could be termed a second electrode layer, and, similarly, a second electrode layer could be termed a first electrode layer, without departing from the scope of the various described embodiments. The first electrode layer and the second electrode layer are both electrode layers, but they are not the same electrode layer.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

Embodiments of the present invention relate to optical systems. More particularly, embodiments of the present invention utilize high dielectric constant materials (i.e., high-κ materials) in optical modulators and switches to reduce power consumption during operation. It is noted that, as used herein, a "high dielectric constant material" is intended to refer to a material with a high dielectric permittivity compared to other materials within operative components of the optical modulator or switch, and in particular compared to the material used to construct the waveguide. Merely by way of example, embodiments of the present invention are provided in the context of integrated optical systems that include active optical devices, but the invention is not limited to this example and has wide applicability to a variety of optical and optoelectronic systems.

According to some embodiments, the active photonic devices described herein utilize electro-optic effects, such as free carrier induced refractive index variation in semiconductors, the Pockels effect, and/or the DC Kerr effect to implement modulation and/or switching of optical signals. Thus, embodiments of the present invention are applicable to both modulators, in which the transmitted light is modulated either ON or OFF, or light is modulated with a partial change in transmission percentage, as well as optical switches, in which the transmitted light is output on a first output (e.g., waveguide) or a second output (e.g., waveguide) or an optical switch with more than two outputs, as well as more than one input. Thus, embodiments of the present invention are applicable to a variety of designs including an M(input)×N(output) systems that utilize the methods, devices, and techniques discussed herein. Some embodiments also relate to electro-optic phase shifter devices, also referred to herein as phase adjustment sections, that may be employed within switches or modulators.

FIG. 1 is a simplified schematic diagram illustrating an optical switch according to an embodiment of the present invention. Referring to FIG. 1, switch 100 includes two inputs: Input 1 and Input 2 as well as two outputs: Output 1 and Output 2. As an example, the inputs and outputs of switch 100 can be implemented as optical waveguides operable to support single mode or multimode optical beams. As an example, switch 100 can be implemented as a Mach-Zehnder interferometer integrated with a set of 50/50 beam splitters 105 and 107, respectively. As illustrated in FIG. 1, Input 1 and Input 2 are optically coupled to a first 50/50 beam splitter 105, also referred to as a directional coupler, which receives light from the Input 1 or Input 2 and, through evanescent coupling in the 50/50 beam splitter, directs 50% of the input light from Input 1 into waveguide 110 and 50% of the input light from Input 1 into waveguide 112. Concurrently, first 50/50 beam splitter 105 directs 50% of the input light from Input 2 into waveguide 110 and 50% of the input light from Input 2 into waveguide 112. Considering only input light from Input 1, the input light is split evenly between waveguides 110 and 112.

Mach-Zehnder interferometer 120 includes phase adjustment section 122. Voltage Vo can be applied across the waveguide in phase adjustment section 122 such that it can have an index of refraction in phase adjustment section 122 that is controllably varied. Because light in waveguides 110 and 112 still have a well-defined phase relationship (e.g., they may be in-phase, 180° out-of-phase, etc.) after propagation through the first 50/50 beam splitter 105, phase adjustment in phase adjustment section 122 can introduce a predetermined phase difference between the light propagating in waveguides 130 and 132. As will be evident to one of skill in the art, the phase relationship between the light propagating in waveguides 130 and 132 can result in output light being present at Output 1 (e.g., light beams are in-phase) or Output 2 (e.g., light beams are out of phase), thereby providing switch functionality as light is directed to Output 1 or Output 2 as a function of the voltage Vo applied at the phase adjustments section 122. Although a single active arm is illustrated in FIG. 1, it will be appreciated that both arms of the Mach-Zehnder interferometer can include phase adjustment sections.

As illustrated in FIG. 1, electro-optic switch technologies, in comparison to all-optical switch technologies, utilize the application of the electrical bias (e.g., Vo in FIG. 1) across the active region of the switch to produce optical variation. The electric field and/or current that results from application of this voltage bias results in changes in one or more optical properties of the active region, such as the index of refraction or absorbance.

Although a Mach-Zehnder interferometer implementation is illustrated in FIG. 1, embodiments of the present invention are not limited to this particular switch architecture and other phase adjustment devices are included within the scope of the present invention, including ring resonator designs, Mach-Zehnder modulators, generalized Mach-Zehnder modulators, and the like. One of ordinary skill in the art would recognize many variations, modifications, and alternatives.

Figure 10:
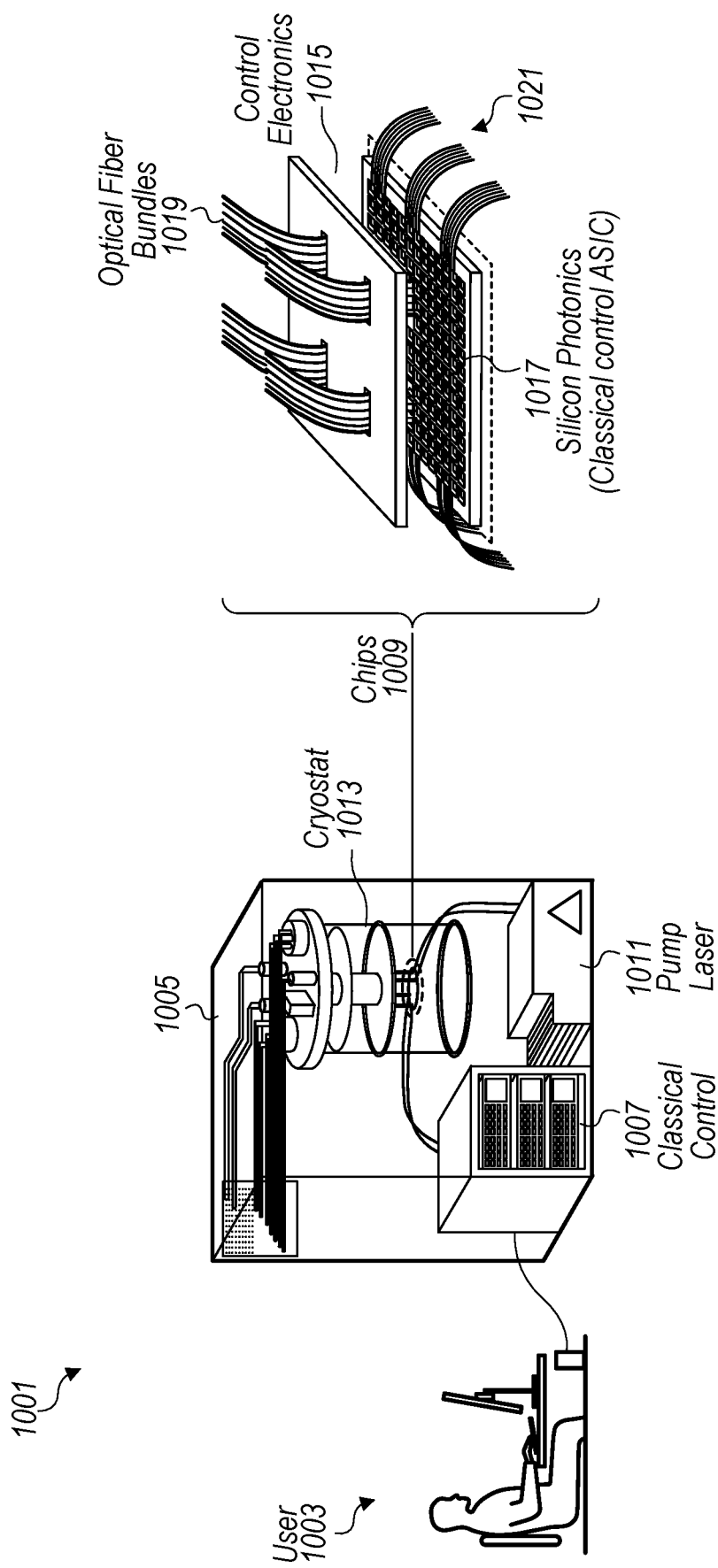
FIG. 10 is an illustration of a user interfacing with a hybrid quantum computing device, according to some embodiments.

In some embodiments, the optical phase shifter devices described herein may be utilized within a quantum computing system such as the hybrid quantum computing system shown in FIG. 10. Alternatively, these optical phase shifter devices may be used in other types of optical systems. For example, other computational, communication, and/or technological systems may utilize photonic phase shifters to direct optical signals (e.g., single photons or continuous wave (CW) optical signals) within a system or network, and phase shifter architectures described herein may be used within these systems, in various embodiments.

FIGS. 2-8—Cross Sections of Photonic Phase Shifters

FIGS. 2-8 are simplified cross-section diagrams illustrating various architectures for a photonic phase shifter, according to various embodiments. Note that the architectures shown in FIGS. 2-8 are schematic illustrations, and are not necessarily drawn to scale. While the architectures shown in FIG. 2-8 differ in several important design features, they also share some features in common. For example, as described in greater detail below, each of FIGS. 2-8 exhibit two electrical contacts, and each electrical contact includes a lead (230, 330, 430, 530, 630, 730, and 830, as well as 232, 332, 432, 532, 632, 732, and 832) connected to an electrode (240, 340, 440, 540, 640, 740, and 840, as well as 242, 342, 442, 542, 642, 742, and 842). It is noted that, as used herein, the term "electrode" refers to a device component that directly couples to the waveguide structure (e.g., to alter the voltage drop across the waveguide structure and actuate a photonic switch). Further, the term "lead" refers to a backend structure that couples the electrodes to other components of the device (e.g., the leads may couple the electrodes to a controllable voltage source), but the leads are isolated from and do not directly couple to the waveguide structure. In some embodiments, the leads may be composed of a metal (e.g., copper, gold, etc.), or alternatively, a semiconductor material.

The electrodes are configured to extend in close proximity to the location of the optical mode in the waveguide, and the photonic phase shifter is configured such that a controllable voltage difference may be introduced across the two electrodes (e.g., dielectric electrodes in some embodiments), to alter the accumulated phase of a photonic mode travelling through the waveguide. For example, the electrodes may be coupled, via the leads, to a voltage source that imposes the controllable voltage difference.

In some embodiments, the electrodes may be composed of a high-κ dielectric material with a large dielectric constant, such that the electrodes have a larger dielectric constant than the material of the waveguide and/or the slab layer. As used herein, κ is used to represent the dielectric constant, which refers to the real component of the relative permittivity, $\kappa=\text{Re}(\varepsilon_r)=\text{Re}(\varepsilon/\varepsilon_0)$, where $\varepsilon_r$ is the complex-valued relative permittivity, $\varepsilon$ is the absolute permittivity of the material, and $\varepsilon_0$ is the permittivity free space. It is noted for clarity that the imaginary component of $\varepsilon_r$ is related to the conductivity of the material, whereas the real component, κ, is related to the dielectric polarizability of the material.

The dielectric constant of a material may have a different value in the presence of a direct current (DC) voltage compared to an (AC) voltage, and the dielectric constant of the material in an AC voltage may be a function of frequency, $\kappa(\omega)$. Accordingly, in some embodiments, when selecting a material for the electrodes, the slab layer, and/or the ridge waveguide, the dielectric constant of the material may be considered at the operating frequency of the photonic phase shifter.

The electrodes may be composed of a material with a higher dielectric constant along the direction separating the first and second electrodes (e.g., the x-direction in FIGS. 2-5 and 7-8, or the y-direction in FIG. 6) than the first material of the slab layer. For example, in anisotropic media, the permittivity tensor E may be expressed by the following matrix which relates the electric field E to the electric displacement D.

$$\begin{bmatrix} D_x(\vec{r}) \\ D_y(\vec{r}) \\ D_z(\vec{r}) \end{bmatrix} = \begin{bmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{bmatrix} \begin{bmatrix} E_x(\vec{r}) \\ E_y(\vec{r}) \\ E_z(\vec{r}) \end{bmatrix}, \quad (1)$$

where the components $\varepsilon_{xx}$, $\varepsilon_{xy}$, etc., denote the individual components of the permittivity tensor. In some embodiments, the material of the first and second electrodes may be selected such that the diagonal component of the permittivity tensor along the direction separating the electrodes is larger than the corresponding diagonal component of the permittivity tensor of the material of the slab layer and/or the ridge portion.

TABLE 1

$\chi^{(3)}$, Refractive Index, and Dielectric Constant Values for Various Materials

| Material | $\chi^{(3)}$ (m²/W) | Refractive Index (at 1.55 μm) | Dielectric Constant |
|---|---|---|---|
| Si | $2.2 \times 10^{-18}$ | ~3.5 | 11.7 |
| Si₃N₄ | $2 \times 10^{-19}$ | 2 | 7-8 |
|  | $1.6 \times 10^{-18}$ | 2.5 |  |
|  | $2 \times 10^{-18}$ | 2.7 |  |
| Ta₂O₅ | $1 \times 10^{-18} - 4 \times 10^{-18}$ | 2.08 | 25-50 |
| TiO₂ | $5 \times 10^{-18} - 6 \times 10^{-17}$ | 2.27-2.6 | 10-85 |
| Graphene Oxide | $4.5 \times 10^{-14}$ | 2.2 (at 1.2 μm) | 2-50 |
| STO |  | ~2.3 | 10,000-24,000 (below 10K) |
| BTO | r42 > 150 pm/V | ~2.3 | 150-200 (below 10K) 1000 to 3000 (at 300K) |

Table 1 illustrates the $\chi^{(3)}$, refractive index, and dielectric constant values for a variety of materials. As shown in Table 1, STO has an extremely high dielectric constant for temperatures below 10K, such that STO may be a desirable material to use for the electrodes, while BTO may be used for the slab layer and/or ridge portion of the waveguide, in some embodiments.

As illustrated, the architectures shown in each of FIGS. 2-8 exhibit a photonic device comprising first and second cladding layers. For example, the regions marked 210, 310, 410, 510, 610, 710, and 810 represent first cladding layers on one side of the waveguide, while the regions marked 212, 312, 412, 512, 612, 712, and 812 represent second cladding layers on the other side of the waveguide. It is noted that the terms "first" and "second" are meant simply to distinguish between the two cladding layers, and, for example, the term "first cladding layer" may refer to the cladding layer on either side of the waveguide. The index of refraction of the first and second cladding layers may be lower than the index of refraction of the waveguide structure, in some embodiments.

FIGS. 2-8 further exhibit a first electrical contact including a first lead (230, 330, 430, 530, 630, 730, and 830) coupled to a first electrode (240, 340, 440, 540, 640, 740, and 840) and a second electrical contact including a second lead (232, 332, 432, 532, 632, 732, and 842) coupled to a second electrode (242, 342, 442, 542, 642, 742, and 842). The first and second leads may be composed of a conducting material such as a metal, or alternatively they may be composed of a semiconductor material. In various embodiments, the first electrode and the second electrode are composed of one or more of gallium arsenide (GaAs), an aluminum gallium arsenide ($Al_xG_{1-x}As$)/GaAs heterostructure, an indium gallium arsenide (InGaAs)/GaAs heterostructure, zinc oxide (ZnO), zinc sulfide (ZnS), indium oxide (InO), doped silicon, strontium titanate (STO), doped STO, barium titanate (BTO), barium strontium titanate (BST), hafnium oxide, lithium niobite, zirconium oxide, titanium oxide, graphene oxide, tantalum oxide, lead zirconium titanate (PZT), lead lanthanum zirconium titanate (PLZT), strontium barium niobate (SBN), aluminum oxide, aluminum oxide, doped variants or solid solutions thereof, or a two-dimensional electron gas. For embodiments where the first and second electrodes are composed of doped STO, the STO may be either niobium doped, lanthanum doped, or vacancy doped, according to various embodiments.

FIGS. 2-8 illustrate a waveguide structure including a slab layer (220, 320, 420, and 520, 651, 754, and 851) comprising a first material, wherein the slab layer is coupled to the first electrode of the first electrical contact and the second electrode of the second electrical contact. In some embodiments, the waveguide structure further includes a ridge portion (251, 351, 451, and 551) composed of the first material (or a different material) and coupled to the slab layer, where the ridge portion is disposed between the first electrical contact and the second electrical contact. In various embodiments, the first material is one of strontium titanate (STO), barium titanate (BTO), barium strontium titanate (BST), hafnium oxide, lithium niobite, zirconium oxide, titanium oxide, graphene oxide, tantalum oxide, lead zirconium titanate (PZT), lead lanthanum zirconium titanate (PLZT), strontium barium niobate (SBN), aluminum oxide, aluminum oxide, or doped variants or solid solutions thereof. The first material may be a transparent material having an index of refraction that is larger than an index of refraction of the first and second cladding layers, in some embodiments.

In some embodiments, a second material composing the first and second electrodes may be selected based on the first material composing the slab layer and/or the waveguide structure. For example, the second material may be selected such that the second material has a larger dielectric constant than the dielectric constant of the first material. As one example, if the first material is BTO, the second material may be selected to be STO, which has a larger dielectric constant than BTO at the cryogenic temperatures (e.g., 4K) at which the photonic device is intended to operate. Advantageously, the large dielectric constant of the electrodes may enable the electrodes to be placed in closer proximity to the waveguide compared to metallic electrodes, for a given acceptable level of loss from the waveguide into the electrodes. For example, the high conductivity of a metallic electrode will result in a larger degree of photon absorption (i.e., loss) from the waveguide compared to the absorption of a electrode at the same separation from the waveguide. Accordingly, the electrodes may be placed in closer proximity to the waveguide than metallic electrodes for a given loss tolerance. The high dielectric constant of the electrodes corresponds to a high polarizability of the dielectric material, which in turn results in an energy-efficient control mechanism to adjust the electric field within the waveguide structure.

In some embodiments, the materials used for the electrodes, and the waveguide structure may be selected based on their effective dielectric constants. For example, while the dielectric constant (or the dielectric tensor for anisotropic materials) of a material is an intrinsic material property, the effective dielectric constant of a structure is proportional to its dielectric constant but also depends on the shape and dimensions of the structure. In these embodiments, the material used for the first and second electrodes may be selected such that the effective dielectric constant of the first and second electrodes is greater than an effective dielectric constant of the waveguide structure.

In some embodiments, a cryogenic device such as the cryostat 1113 shown in FIG. 10 may be configured to maintain the first electrical contact, the second electrical contact, and the waveguide structure at a cryogenic temperature, e.g., at or below 77 Kelvin.

In some embodiments, the first electric contact and the second electrical contact are configured to generate an electric field along one or more directions, e.g., along the x-direction in the waveguide structure, and the waveguide structure may be characterized by an electro-optic coefficient, (e.g., $\chi^{(2)}$, the Pockel's coefficient, or $\chi^{(3)}$, the Kerr coefficient) having a non-zero value aligned along the direction of the electric field. For example, the leads may be coupled to a voltage source that imposes a controllable (e.g., programmable) voltage difference, thereby generating an electric field in the waveguide structure, as illustrated in FIG. 10. Additionally or alternatively, a guided mode supported by the waveguide structure may have a direction of polarization aligned with the x-direction.

In some embodiments, the first electrode and the second electrode are configured as a second layer coplanar to the slab layer and disposed adjacent to a first side of the slab layer. For example, the first and second electrodes may be grown (e.g., using epitaxy or another method such as metal organic chemical vapor deposition, molecular beam epitaxy, physical vapor deposition, sol-gel, etc.) onto the first side of the slab layer, such that the first and second dielectric layers are directly coupled to the slab layer. Alternatively, in some embodiments an intervening layer may be disposed between the slab layer and the first and second dielectric layer, such that the slab layer and the first and second dielectric layers are indirectly coupled. The intervening layer may be composed of an oxide material, in some embodiments.

The first electrode and the second electrode may be separated by a gap region, e.g., gap region 243 or 343. In some embodiments, the gap region may have been etched out, and may be filled with a cladding material. In some embodiments, both the first and second electrodes may be grown as a single second layer over the slab layer, and a region may be subsequently etched out to separate the first and second electrodes. This etched region may be subsequently filled with a cladding material. Alternatively, the etched region may be left empty (i.e., may be filled with air or vacuum).

In some embodiments, the first electrode and the second electrode have a dielectric constant greater than a dielectric constant of the first material in the direction separating the first and second electrodes. The dielectric constant of the first electrode and the second electrode may be greater than the dielectric constant of the waveguide structure at a first temperature that is greater than 1 mK, less than 77K, less than 150K, and/or within another temperature range. In some embodiments, the first material is a transparent material having an index of refraction that is larger than an index of refraction of the first and second cladding layers. In some embodiments, a ratio between the dielectric constant of the first and second electrodes and the dielectric constant of the first material is 2 or greater.

Transparent Electrodes

The electrical conductivity of a material is proportional to both its carrier mobility (e.g., electron mobility or hole mobility) and carrier concentration (e.g., its free electron density or hole density). Increased conductivity of the electrodes of a photonic phase shifter device may be desirable, as it may enable increased control of the device at higher frequencies and/or with reduced heating of the electrodes. However, a large free electron density of the electrodes may be undesirable, as an electrode with a large free electron density may provide a large absorptive reservoir for photons within the waveguide structure to be absorbed by the free electrons of the electrode (e.g., thereby escaping out of the waveguide structure and into the electrodes). Said another way, increasing the conductivity of the electrodes by increasing the free electron density of the material selected for the electrodes may be undesirable, as this may increase the photonic loss rate of the device.

To address these and other concerns, in some embodiments, the electrodes may be composed of a second material that is selected to have a high conductivity by virtue of its high carrier mobility, rather than due to its high carrier concentration. Advantageously, the high carrier mobility material may produce a proportionally high conductivity without introducing high photon absorption. A high carrier mobility material may exhibit desirable conductivity properties while maintaining transparency to optical modes within the waveguide by virtue of its relatively lower carrier concentration (e.g., low relative to a material with a similar conductivity and a low carrier mobility). Classical Drude theory predicts that free carrier absorption is proportional to the doping level and inversely proportional to the optical mobility. Accordingly, materials with high mobility may exhibit both decrease resistance and free carrier absorption.

For example, in some embodiments the first electrode and the second electrode are composed of a second material, where the second material has a high carrier mobility (e.g., a high electron mobility or a high hole mobility). As one example, the second material may be selected such that its electron mobility is higher than silicon. In some embodiments, the second material may be selected such that it has a band gap larger than an operating frequency of the device.

In some embodiments, the second material comprises one of gallium arsenide (GaAs), an aluminum gallium arsenide $(Al_xG_{1-x}As)$/GaAs heterostructure, an indium gallium arsenide (InGaAs)/GaAs heterostructure, zinc oxide (ZnO), zinc sulfide (ZnS), indium oxide (InO), doped silicon, a two-dimensional electron gas, or doped strontium oxide (STO). For embodiments where the second material comprises doped STO, the doped STO may be either niobium doped, lanthanum doped, or vacancy doped, among other possibilities. For example, bulk GaAs has an electron mobility of 8500 $cm^2$/Vs, which is 6 times higher than the electron mobility of silicon. Heterostructures of InGaAs/GaAs may reach mobilities of 41000 $cm^2$/Vs at 4 Kelvin and $Al_xG_{1-x}As$/GaAs heterostructures may reach mobilities of up to 180,000 $cm^2$/Vs. In comparison, Si has a mobility of 1500 $cm^2$/Vs. Doped STO may also exhibit high electron mobilities, from 10,000 $cm^2$/Vs to 53,000 $cm^2$/Vs, depending on carrier concentration.

For embodiments where the second material is a doped material, the doping concentration may be selected based on the absorptive properties of the resultant doped material. For example, the absorption of the doped material may be analyzed at the operating frequency or frequencies of the electro-photonic device for each of a plurality of doping concentrations, and a doping concentration may be selected which exhibits low absorption at the operating frequency or frequencies.

The following paragraphs describe various design features that differ between the architectures shown in FIGS. 2-8.

Figure 2:
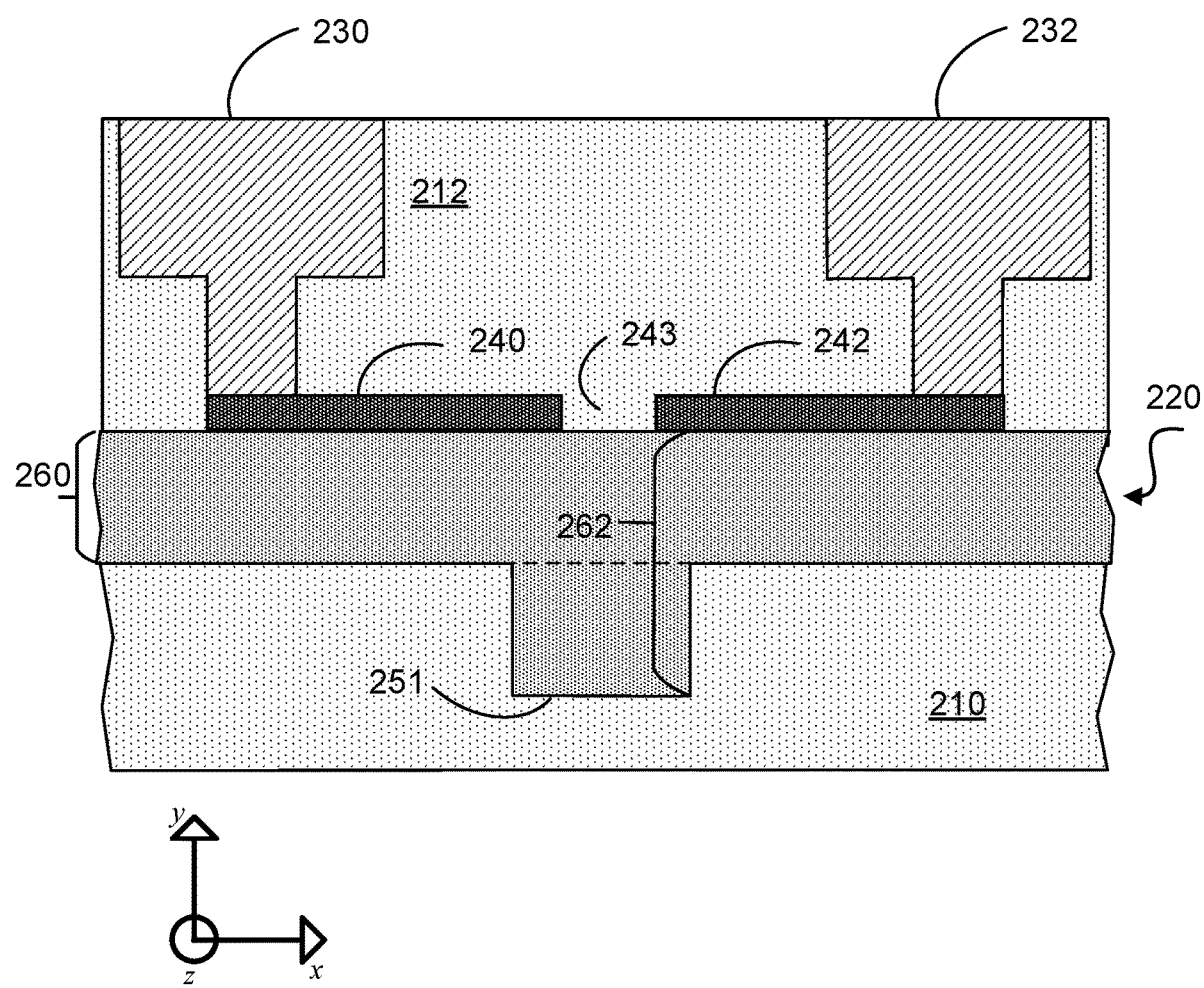
FIG. 2 is a simplified schematic diagram illustrating a cross section of a waveguide structure incorporating high-K electrodes placed opposite the waveguide ridge, according to some embodiments.

FIG. 2 illustrates an architecture where the ridge portion of the waveguide structure (251) is disposed on the bottom of the slab layer and extends into the first cladding layer (210). As illustrated in FIG. 2, the combination of the ridge portion and the slab layer has a first thickness (262) greater than a second thickness (260) of the slab layer alone (220), and the excess of the first thickness relative to the second thickness extends into the cladding layer (210) on the bottom side of the slab layer. As illustrated in FIG. 2, the first electrode (240) and the second electrode (242) are coupled to the slab layer (220) on the top side of the slab layer opposite the bottom side. Further, the first electrical contact (230) and the second electrical contact (232) are disposed on the top side of the slab layer (220). It should be noted that the terms "top" and "bottom" are used for clarity in reference to the perspective illustrated in the Figures, and do not necessarily refer to any particular orientation relative to the overall device.

Figure 3:
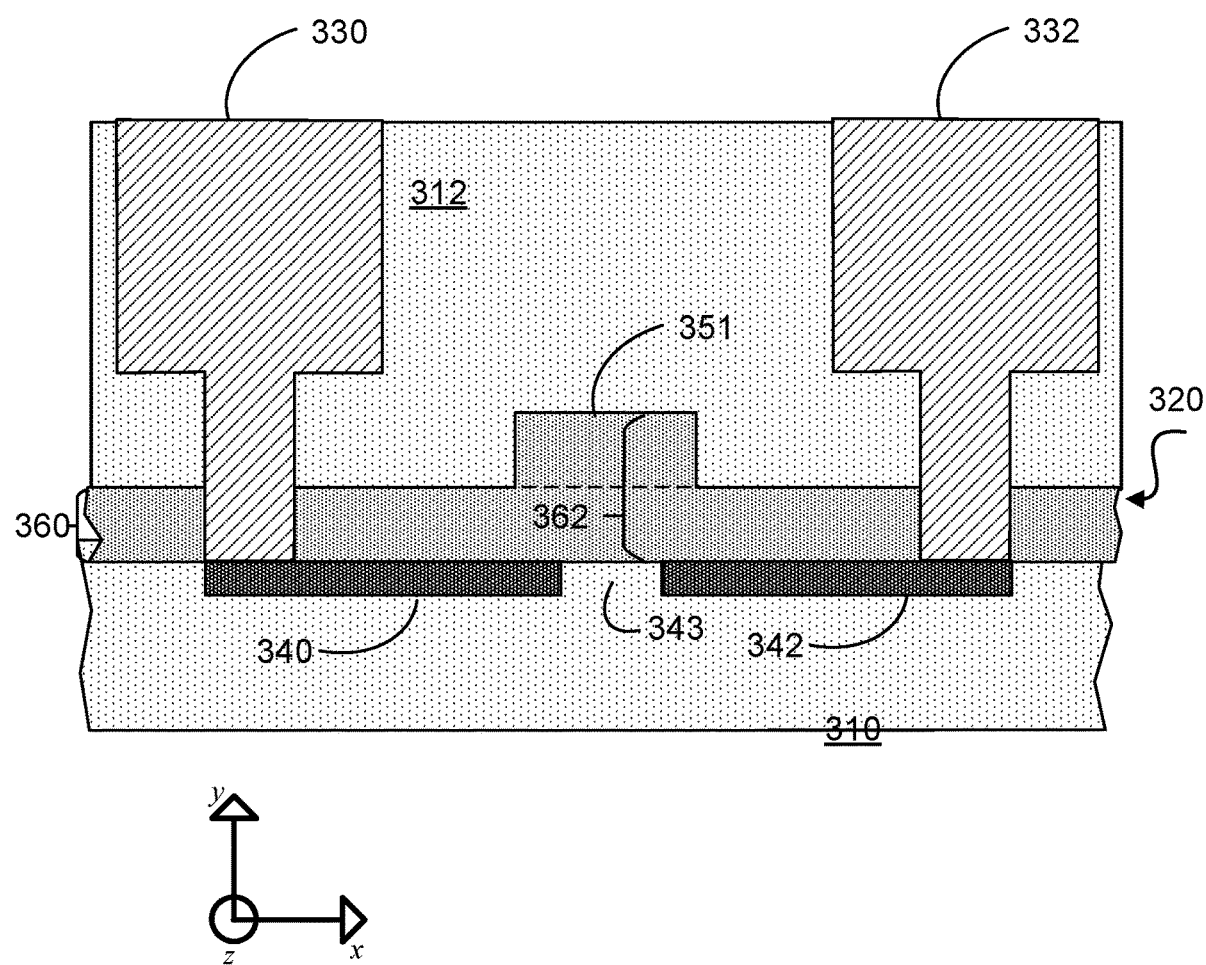
FIG. 3 is a simplified schematic diagram illustrating a cross section of a waveguide structure incorporating high-K electrodes placed opposite the waveguide ridge with penetrating leads, according to some embodiments.

FIG. 3 illustrates an architecture where the ridge portion of the waveguide structure (351) is disposed on the top side of the slab layer and extends into a first cladding layer (312), the first electrode and the second electrode are coupled to the slab layer on the bottom side of the slab layer opposite the top side. As illustrated, the combination of the ridge portion and the slab layer has a first thickness (362) greater than a second thickness (360) of the slab layer alone (320), and the excess of the first thickness relative to the second thickness extends into the first cladding layer (312) on the top side of the slab layer (320). As illustrated in FIG. 3, the first electrode (340) and the second electrode (342) are coupled to the slab layer (320) on the bottom side of the slab layer opposite the top side. Further, the first electrical contact (330) is coupled to the first electrode (340) by penetrating through the slab layer (320) from the top side of the slab layer to the bottom side of the slab layer, and the second electrical contact (332) is coupled to the second electrode (342) by penetrating through the slab layer (320) from the top side of the slab layer to the bottom side of the slab layer.

Figure 4:
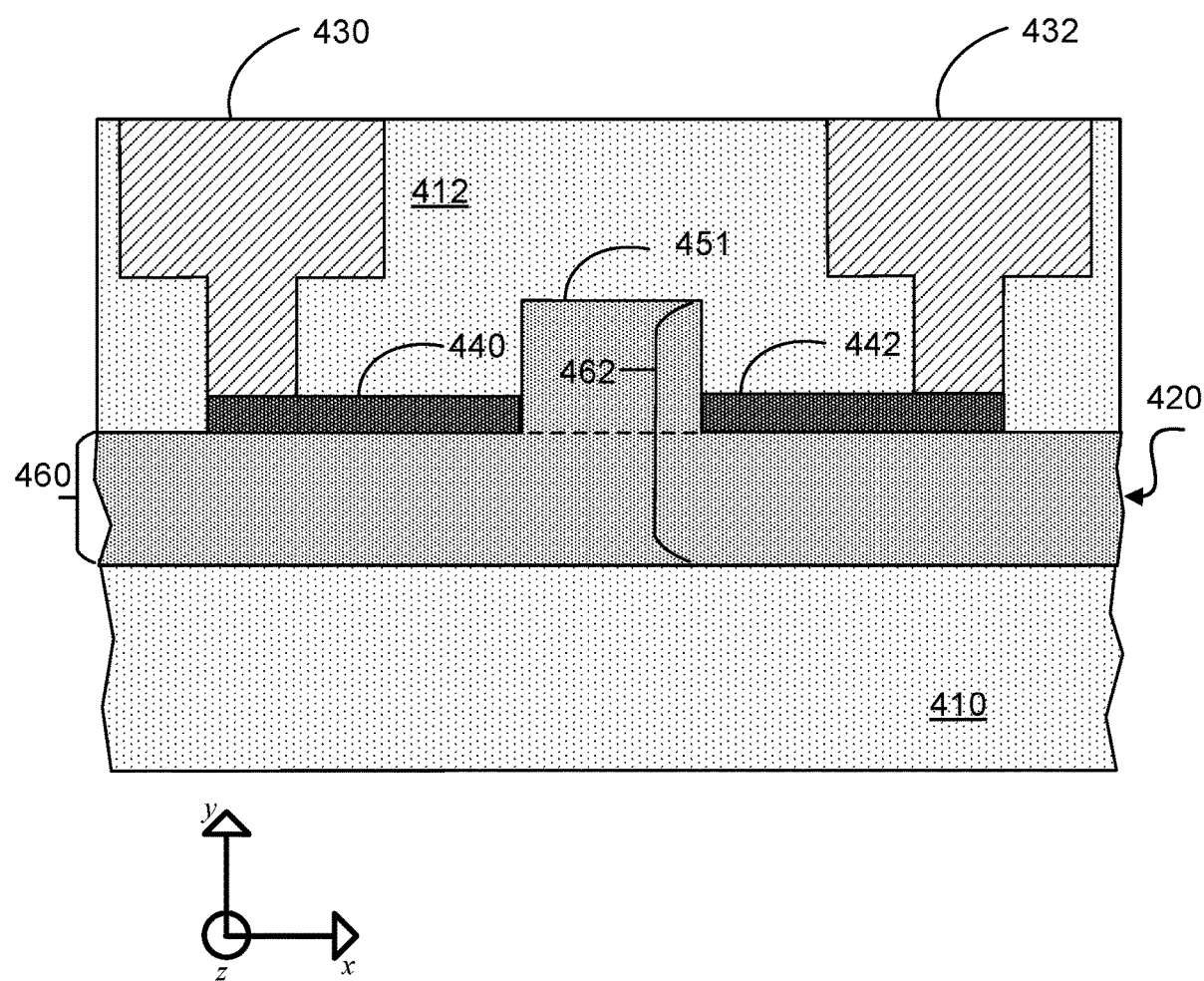
FIG. 4 is a simplified schematic diagram illustrating a cross section of a waveguide structure incorporating high-K electrodes placed on the same side as the waveguide ridge, according to some embodiments.

FIG. 4 illustrates an architecture where the combination of the slab layer and the ridge portion of the waveguide structure (451) has a first thickness (462) greater than a second thickness (460) of the slab layer (420), and the excess of the first thickness relative to the second thickness extends into the first cladding layer (412) on the top side of the slab layer. As illustrated in FIG. 4, the first electrode (440) and the second electrode (442) are coupled to the first material (420) on the top side of the slab layer. Further the first electrode (440) and the second electrode (442) abut the ridge portion of the waveguide structure (451).

Figure 5:
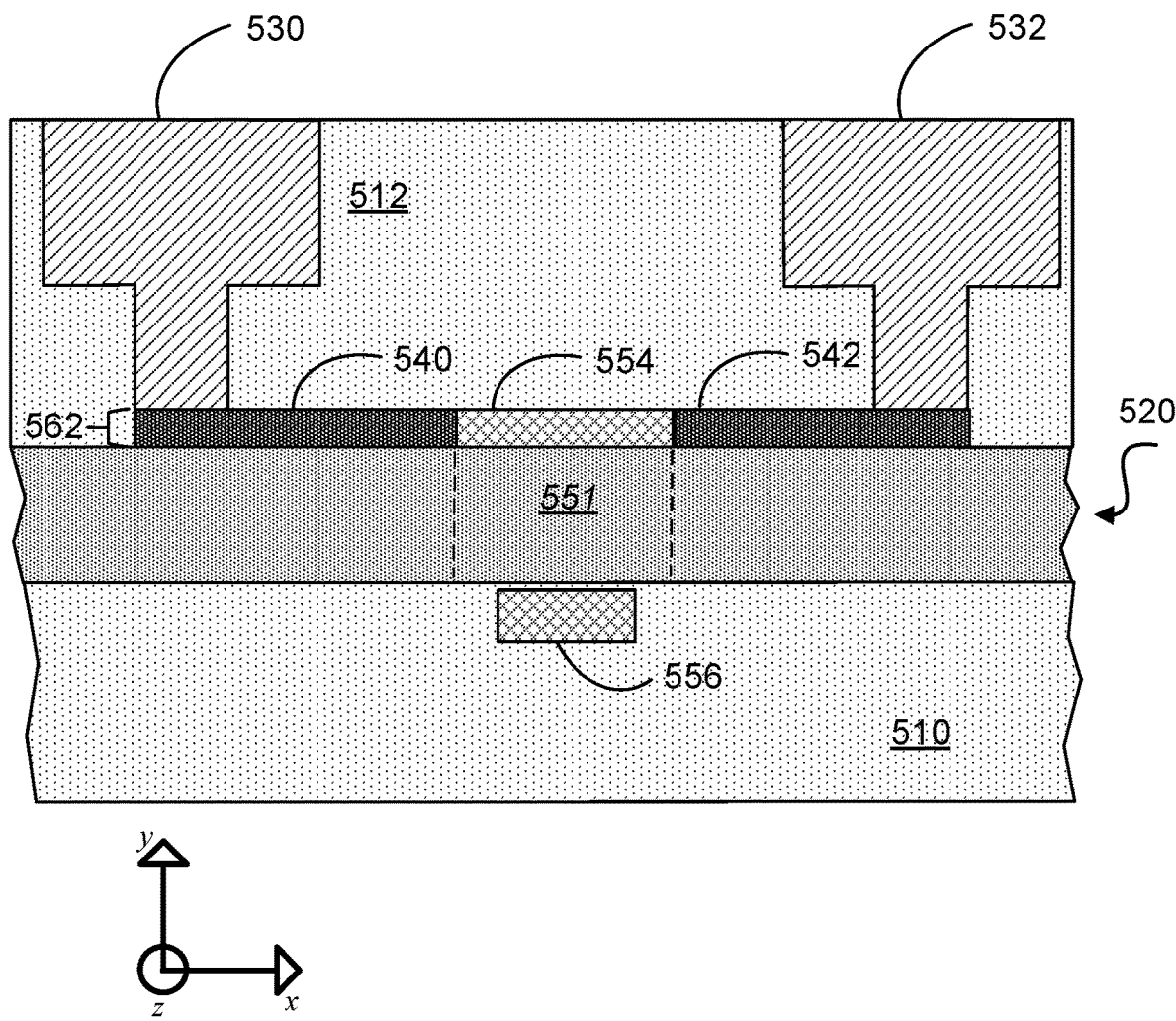
FIG. 5 is a simplified schematic diagram illustrating a cross section of a waveguide structure incorporating high-K electrodes and exhibiting a sandwich structure, according to some embodiments.

FIG. 5 illustrates an architecture where the waveguide structure includes a first strip waveguide portion (554) and a second strip waveguide portion (556), where the first and second waveguide portions are composed of a second material, and where the slab layer (520) is disposed between the first waveguide portion (554) and the second waveguide portion (556). A first electrode (540) and a second electrode (542) are disposed on the electro-optic layer (520), a first lead (530) is coupled to the first electrode, and a second lead (532) is coupled to the second electrode. The device architecture illustrated in FIG. 5 may be fabricated by the method described in reference to FIG. 15, according to some embodiments.

In some embodiments, the first strip waveguide portion is composed of silicon nitride (Si3N4) and the second strip waveguide portion is composed of silicon. In other embodiments, both the first and second strip waveguide portions are composed of silicon nitride ($Si_3N_4$). Alternatively, each of the first and second waveguide portions may separately be composed of $Si_3N_4$, silicon dioxide ($SiO_2$), aluminum oxide ($Al_2O_3$), or another material.

As illustrated in FIG. 5, the first electrode and the second electrode abut the first strip waveguide, and the first electrical electrode and the second electrode have a first thickness (562). In some embodiments, the first electrode and the second electrode comprise a second layer coplanar to the electro-optic layer and disposed adjacent to a first side of the electro-optic layer.

In some embodiments, the first and second strip waveguide portions are configured to concentrate the maximum intensity portion of an optical mode within the electro-optic layer. In other words, having only a first strip waveguide portion (554) on one side of the slab layer (520) and a cladding layer on the other side (i.e., without the second strip waveguide portion 556), or having only a second strip waveguide portion (556) on one side of the slab layer (520) and a cladding layer on the other side (i.e., without the first strip waveguide portion 554) may result in a vertically offset and/or less concentrated optical mode. In some embodiments, the first strip waveguide portion abuts the slab layer and the second strip waveguide portion is separated by a small distance (e.g., several nanometers or another distance) from the slab layer. Alternatively, (not shown in FIG. 5), both the first and second strip waveguide portions may abut the slab layer.

Figure 6:
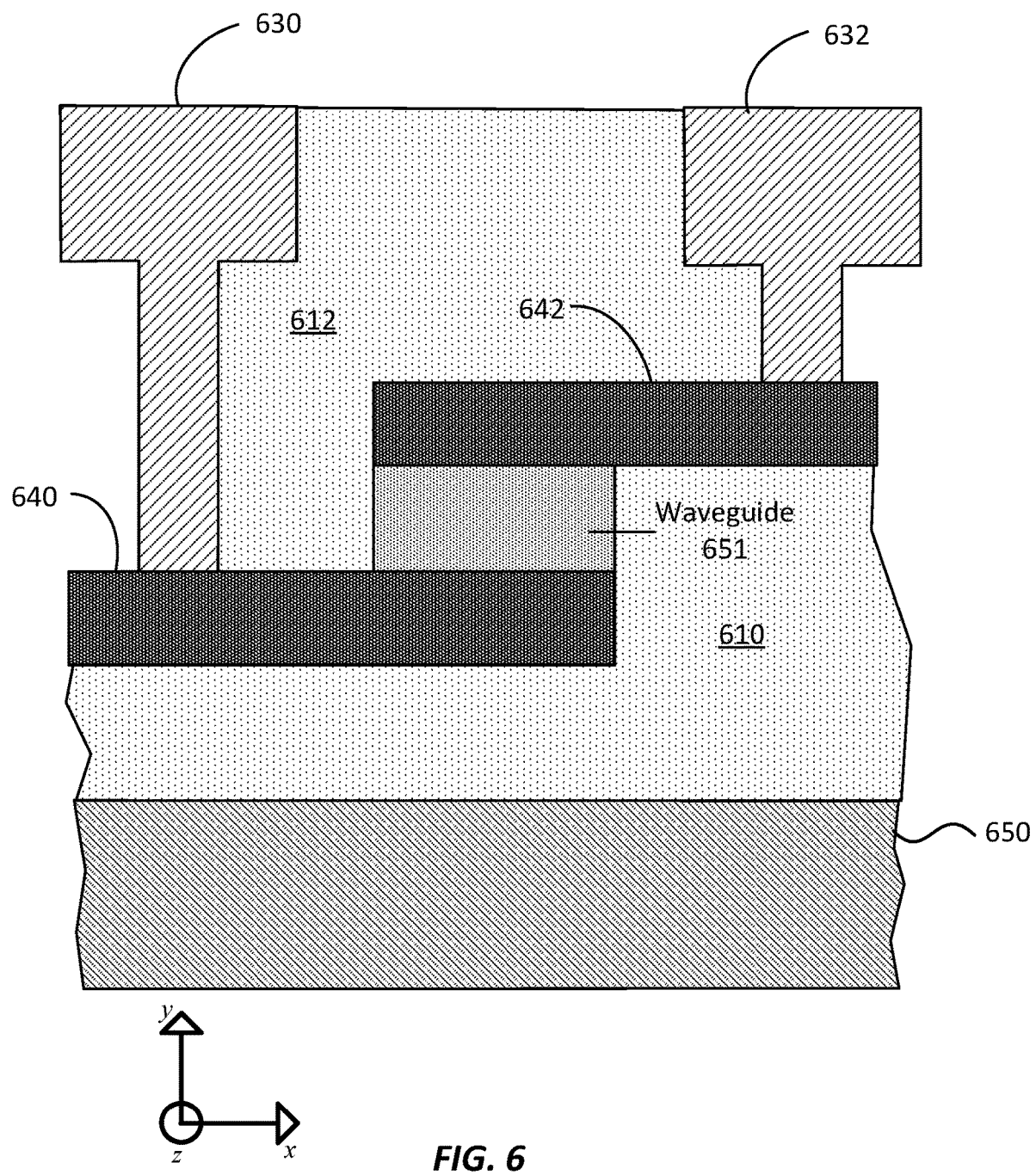
FIG. 6 is a simplified schematic diagram illustrating a cross section of a vertical waveguide structure incorporating high-K materials, according to some embodiments.

FIG. 6 illustrates a vertical waveguide architecture where the first electrode (642) is coupled to the slab layer (651) on the top side of the slab layer and the second electrode (640) is coupled to the slab layer (651) on the bottom side of the slab layer opposite the top side. In other words, the first and second electrodes are coupled to the top and bottom sides of the waveguide structure, such that the induced electric field within the waveguide structure is oriented along the y-direction.

Figure 7:
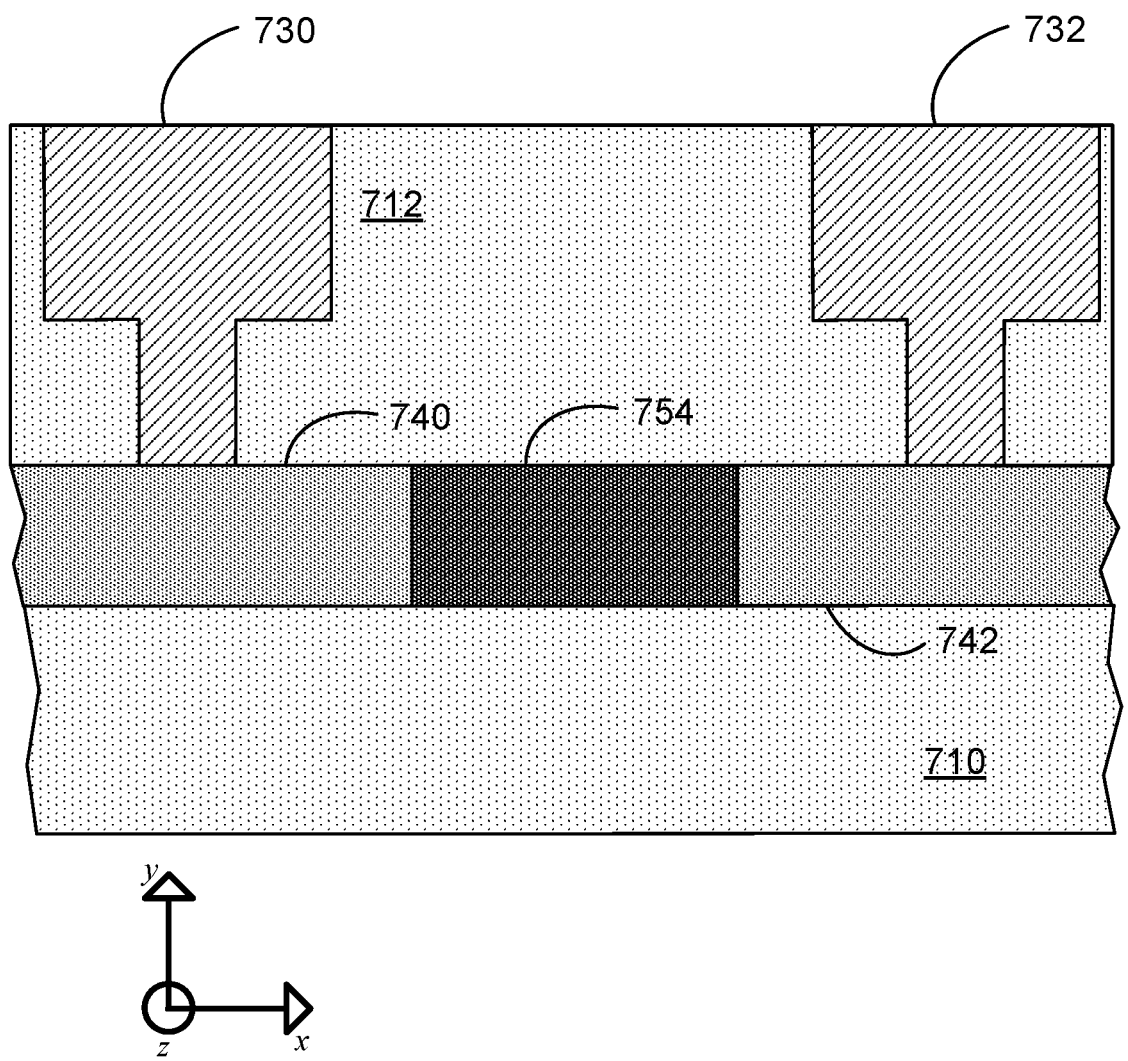
FIG. 7 is a simplified schematic diagram illustrating a cross section of a waveguide structure with the electrodes inline with the waveguide structure, according to some embodiments.

FIG. 7 illustrates a waveguide architecture where each of the first (740) and second (742) electrodes are disposed inline with the waveguide structure (754). In other words, each of the first and second electrodes and the waveguide structure are disposed within a single layer with a single width.

Figure 8:
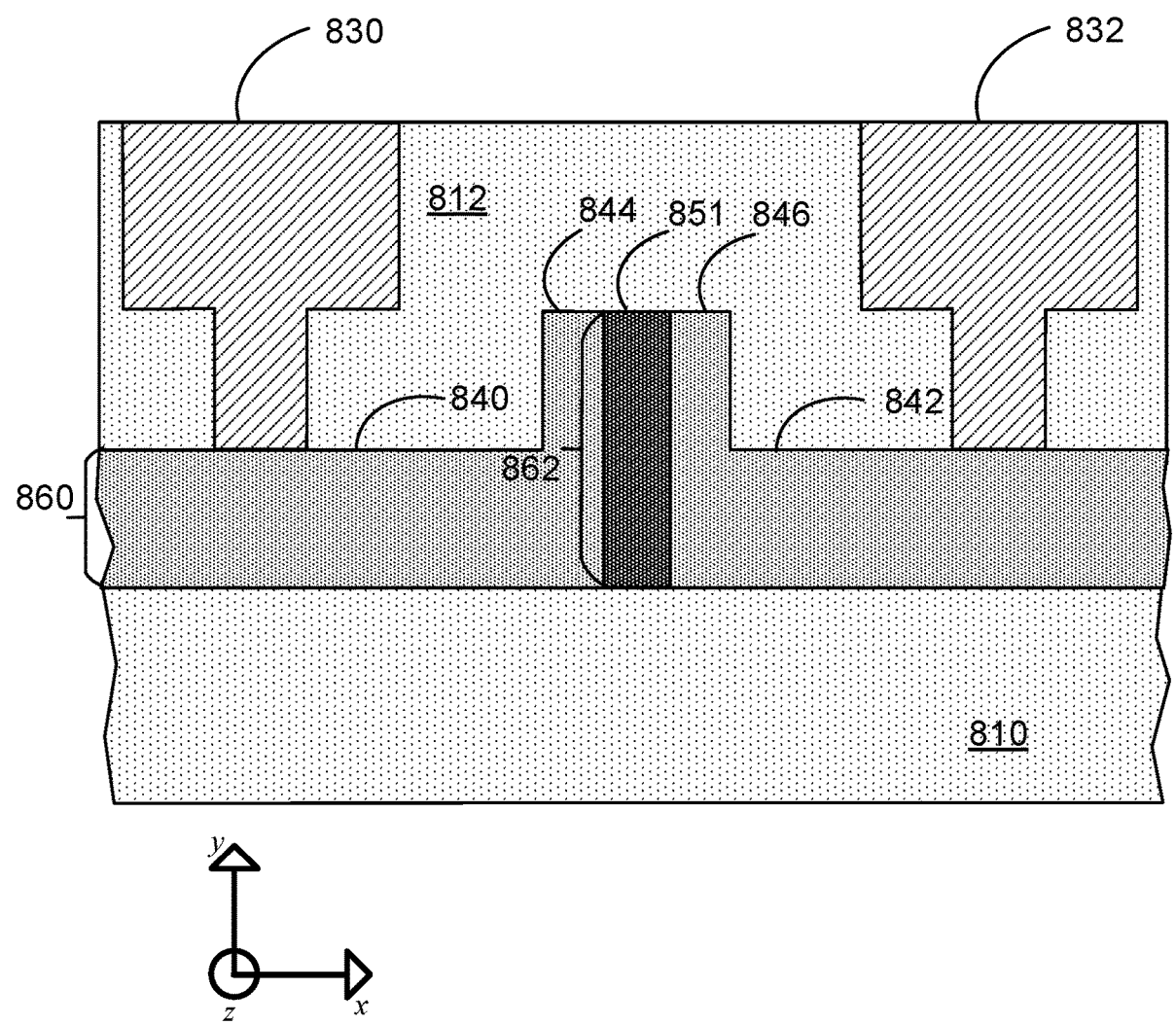
FIG. 8 is a simplified schematic diagram illustrating a cross section of a waveguide structure with electrodes exhibiting ridge-like profiles, according to some embodiments.

FIG. 8 illustrates a waveguide architecture where the first (840) and second (842) electrodes share a ridge-like profile with the waveguide structure (851), where the ridge-like profile extends into the first cladding layer (812). For example, the first electrode (840) may include a ridge portion (844) having a thickness (862) that is greater than a thickness (860) of the remainder of the first electrode, and the second electrode (842) may include a ridge portion (846) having a thickness (862) that is greater than the thickness (860) of the remainder of the second electrode. Further, the ridge portions of the first and second electrodes may exhibit the same thickness as the waveguide structure (851).

Figure 9:
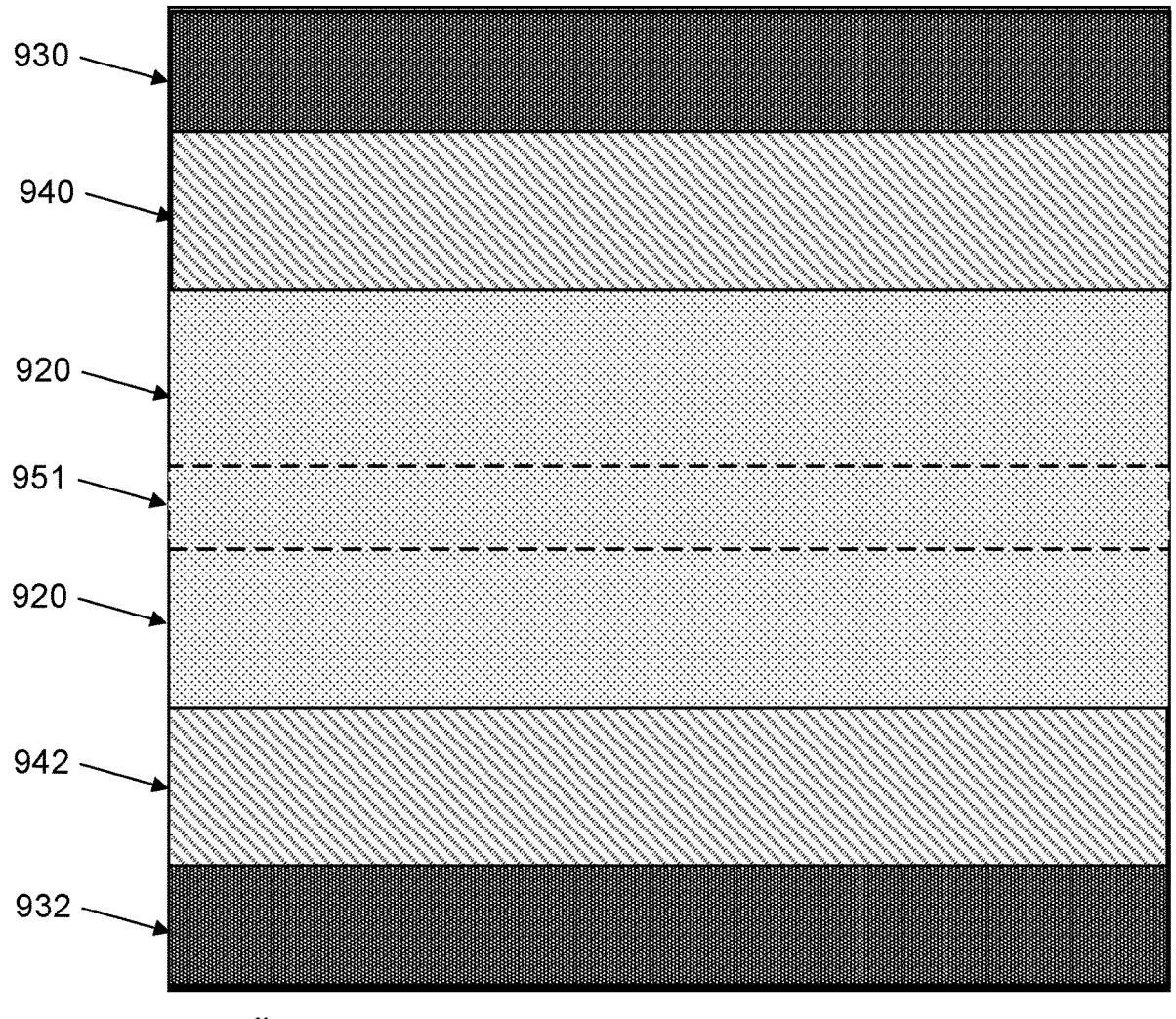
FIG. 9 is a simplified schematic diagram showing a top view of a waveguide structure, according to some embodiments.

FIG. 9—Top-Down View of Photonic Phase-Shifter

FIG. 9 is a top-down view of a photonic phase-shifter architecture, according to some embodiments. As illustrated, the phase-shifter may include first (930) and second (932)

leads, first (940) and second (942) electrodes, a slab (e.g., waveguide) layer (920), and a ridge portion of the waveguide structure (951).

FIG. 10—Hybrid Quantum Computing System

FIG. 10 is a simplified system diagram illustrating incorporation of an electro-optic switch with a cryostat into a hybrid quantum computing system, according to some embodiments. In order to operate at low temperatures, for example liquid helium temperatures, embodiments of the present invention integrate the electro-optic switches discussed herein into a system that includes cooling systems. Thus, embodiments of the present invention provide an optical phase shifter that may be used within a hybrid computing system, for example, as illustrated in FIG. 8. The hybrid computing system 1101 includes a user interface device 1103 that is communicatively coupled to a hybrid quantum computing (QC) sub-system 1105. The user interface device 1103 can be any type of user interface device, e.g., a terminal including a display, keyboard, mouse, touch-screen and the like. In addition, the user interface device can itself be a computer such as a personal computer (PC), laptop, tablet computer and the like. In some embodiments, the user interface device 1103 provides an interface with which a user can interact with the hybrid QC subsystem 1105. For example, the user interface device 1103 may run software, such as a text editor, an interactive development environment (IDE), command prompt, graphical user interface, and the like so that the user can program, or otherwise interact with, the QC subsystem to run one or more quantum algorithms. In other embodiments, the QC subsystem 1105 may be pre-programmed and the user interface device 1103 may simply be an interface where a user can initiate a quantum computation, monitor the progress, and receive results from the hybrid QC subsystem 1105. Hybrid QC subsystem 1105 further includes a classical computing system 1107 coupled to one or more quantum computing chips 1109. In some examples, the classical computing system 1107 and the quantum computing chip 1109 can be coupled to other electronic components 1111, e.g., pulsed pump lasers, microwave oscillators, power supplies, networking hardware, etc.

In some embodiments that utilize cryogenic operation, the quantum computing system 1109 can be housed within a cryostat, e.g., cryostat 1113. In some embodiments, the quantum computing chip 1109 can include one or more constituent chips, e.g., hybrid electronic chip 1115 and integrated photonics chip 1117. Signals can be routed on- and off-chip any number of ways, e.g., via optical interconnects 1119 and via other electronic interconnects 1121.

Figure 11:
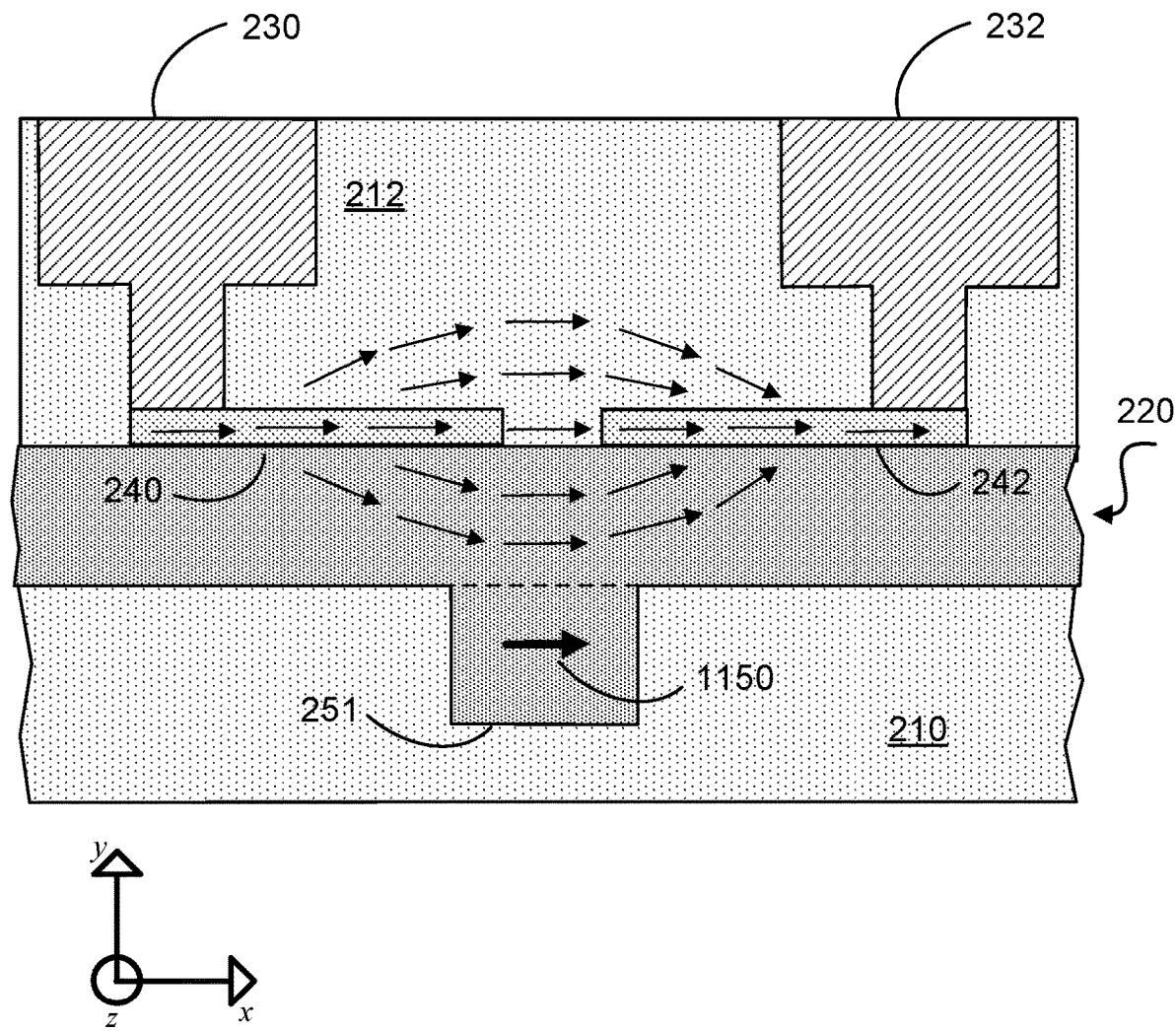
FIG. 11 is a simplified schematic diagram illustrating a cross section of a waveguide structure that shows the direction of an induced electric field, according to some embodiments.

FIG. 11—Induced Electric Field in a Photonic Phase Shifter

FIG. 11 is a simplified schematic diagram illustrating a cross section of the waveguide structure shown in FIG. 2, where the direction of the induced electric field is illustrated with arrows, according to some embodiments. As illustrated, the small arrows show the induced electric field direction which generally points along the positive x-direction through the electrodes of the device. The electric field curves in a convex manner both above and below the electrodes, as illustrated. Furthermore, the large arrow (1150) pointing in the positive x-direction illustrates the direction of polarization of an optical mode that may travel through the slab layer and the waveguide.

FIGS. 12-15—Fabrication Methods for Electro-Optical Devices

Recent technology advancements have demonstrated successful growth of ferroelectric thin films on planar Si substrates using complex molecular beam epitaxy (MBE) techniques, which makes it possible for monolithic integration of various complex oxides in electro-optical devices using semiconductor processing technologies. $BaTiO_3$ or BTO is considered the material of choice for next generation electro-optical switches due to its high Pockels coefficient, high band width, and low dielectric loss. In some embodiments, a blanket BTO thin film may be epitaxially grown on a silicon substrate using $SrTiO_3$ as a buffer. A silicon dioxide ($SiO_2$) bonding layer may be then overlaid on the BTO thin film. On another silicon wafer, a silicon waveguide is formed and is surrounded by a silicon dioxide cladding layer having a flat top surface, which can be obtained by, for example, chemical mechanical polishing after blanket deposition of the silicon dioxide layer over the silicon waveguide. The first wafer with the blanket BTO film formed thereon is bonded to the second wafer through wafer-to-wafer bonding, so that the blanket BTO film is transferred to the flat top surface of the silicon dioxide cladding on the second wafer. This first wafer is subsequently removed (e.g., by grinding and/or chemical mechanical polishing), and electrodes or contacts are then formed in the BTO film to allow application of an electric field across the contacts. This process involves transferring of the BTO film from one substrate to another, and is thus inefficient, costly, and limiting on the underlying device architecture. FIGS. 12-15 illustrate improved methods for the fabrication process of various electro-optical device architectures, according to various embodiments.

FIGS. 12A-G are schematic diagrams illustrating a fabrication method for constructing the electro-optical device with a ridge waveguide positioned opposite to the electrodes, according to some embodiments.

FIG. 12A illustrates initial steps for constructing a device, including depositing a seed layer (1204) on a substrate layer (1202), and depositing an electro-optic layer (1206) on the seed layer (1204). The sequential layers may be epitaxially deposited, or they may be deposited using another technique. In some embodiments, a first wafer comprising a first layer stack may be received, where the first layer stack includes the illustrated substrate layer (1202), seed layer (1204), and electro-optic layer (1206). In other words, a pre-fabricated wafer corresponding to that illustrated in FIG. 12A may be received from a manufacturer. Alternatively, a partially completed wafer comprising one or more of the seed layer (1204), substrate layer (1202), and/or electro-optic layer (1206) may be received, and the remaining layers may be deposited to complete the wafer.

In some embodiments, the substrate layer is a silicon-on-insulator (SOI) wafer, and the first portion of the substrate layer is a top silicon layer of the SOI wafer in contact with the seed layer. The SOI wafer may include a semiconductor (e.g., silicon or Si) base, an oxide layer (e.g., silicon dioxide or $SiO_2$) on the semiconductor base substrate, and a semiconductor layer (e.g., silicon) on the oxide layer. Although a silicon-based SOI substrate having a silicon layer on a silicon dioxide layer on a silicon base substrate is used herein as an example of the SOI substrate, the SOI substrate can be based on other types of semiconductors (e.g., germanium or gallium arsenide). The thickness of the silicon layer and the $SiO_2$ layer on the SOI substrate can vary according to various embodiments. In some embodiments, the thickness of the silicon layer on the SOI substrate is equal to or less than 150 nm, the thickness of the $SiO_2$ layer can range from 0.5 to 4 µm, and the thickness of the silicon base can range from 100 µm to 2 mm.

In some embodiments, the seed layer is composed of one of strontium titanate (STO), barium strontium titanate (BST), hafnium oxide, zirconium oxide, titanium oxide, graphene oxide, tantalum oxide, lead zirconium titanate (PZT), lead lanthanum zirconium titanate (PLZT), strontium barium niobate (SBN), magnesium oxide (MgO), germanium (Ge), or the like. In some embodiments, the seed layer may be thinner than 30 nm, and may serve as an interworking layer to attach the electro-optic layer to the substrate layer. In these embodiments, the seed layer and the interworking layer may ultimately be removed in a subsequent fabrication step. Alternatively, in some embodiments the seed layer may be thicker (e.g., from 4 nm-300 nm in thickness), and may be subsequently etched to split the seed layer into a first electrode separated from a second electrode, as described in greater detail below.

In some embodiments, the electro-optic layer is composed of one of barium titanate (BTO), barium strontium titanate (BST), lithium niobite, lead zirconium titanate (PZT), lead lanthanum zirconium titanate (PLZT), aluminum oxide, aluminum nitrite, or strontium barium niobate (SBN). In some embodiments, the first cladding layer may be composed of silicon dioxide, or another material.

In some embodiments, depositing the seed layer on the substrate layer includes obtaining an SOI substrate having a clean silicon surface (e.g., Si [001] 2×1 reconstructed surface), and passivating the silicon surface using conventional techniques. After the silicon surface is passivated, a $SrTiO_3$ buffer layer can be epitaxially grown on the silicon layer. A thin film (~3 nm to 30 nm) epitaxially grown SrTiO3 layer may be grown initially as a buffer layer to promote the epitaxial growth of the subsequently deposited BaTiO3 layer. In some embodiments, the first few MLs (1-3 ML) of $SrTiO_3$ can be grown at a lower temperature (e.g., 100-300° C.) under, for example, an oxygen pressure of $10^{-8}$-$1.5×10^{-6}$ Torr, in order to avoid oxidation at the silicon surface. These few MLs of $SrTiO_3$ is mostly amorphous so an annealing process at higher temperature (e.g., 500-750° C.) in ultra-high vacuum conditions (e.g., pressure $<5×10^{-9}$ Torr) may be performed to crystallize the $SrTiO_3$ grown on the silicon surface. More $SrTiO_3$ may be then grown at higher temperature (e.g., 500-600° C.), or at lower temperature (e.g., 300-500° C.) followed by annealing at higher temperature (e.g., 550-750° C.) until a desired thickness of the $SrTiO_3$ buffer layer is achieved.

FIG. 12b illustrates how the electro-optic layer is etched to construct a ridge waveguide structure (1224). Subsequent to etching the electro-optic layer, a first cladding layer (1208) is deposited on the electro-optic layer (1206). For example, before depositing the first cladding layer, a ridge structure may be formed from a uniform electro-optic layer. In some embodiments, the ridge waveguide structure can be formed by obtaining an electro-optic layer with a e.g., 200-350 nm thickness, masking the area on the electro-optic layer where the ridge waveguide structure is to be situated, and etching the electro-optic layer on the SOI substrate using an anisotropic etching (e.g., RIE) process to thin down the unmasked portion of the electro-optic layer to, for example, less than 150 nm. The first cladding layer is then deposited on the ridge waveguide structure and the portion of the electro-optic layer that has been thinned down.

FIG. 12C illustrates planarizing the first cladding layer (1210). For example, the upper surface of the first cladding layer shown in FIG. 12A may not be sufficient planar, and the first cladding layer may be planarized to reduce variations in thickness of the first cladding layer.

Figure 12D:
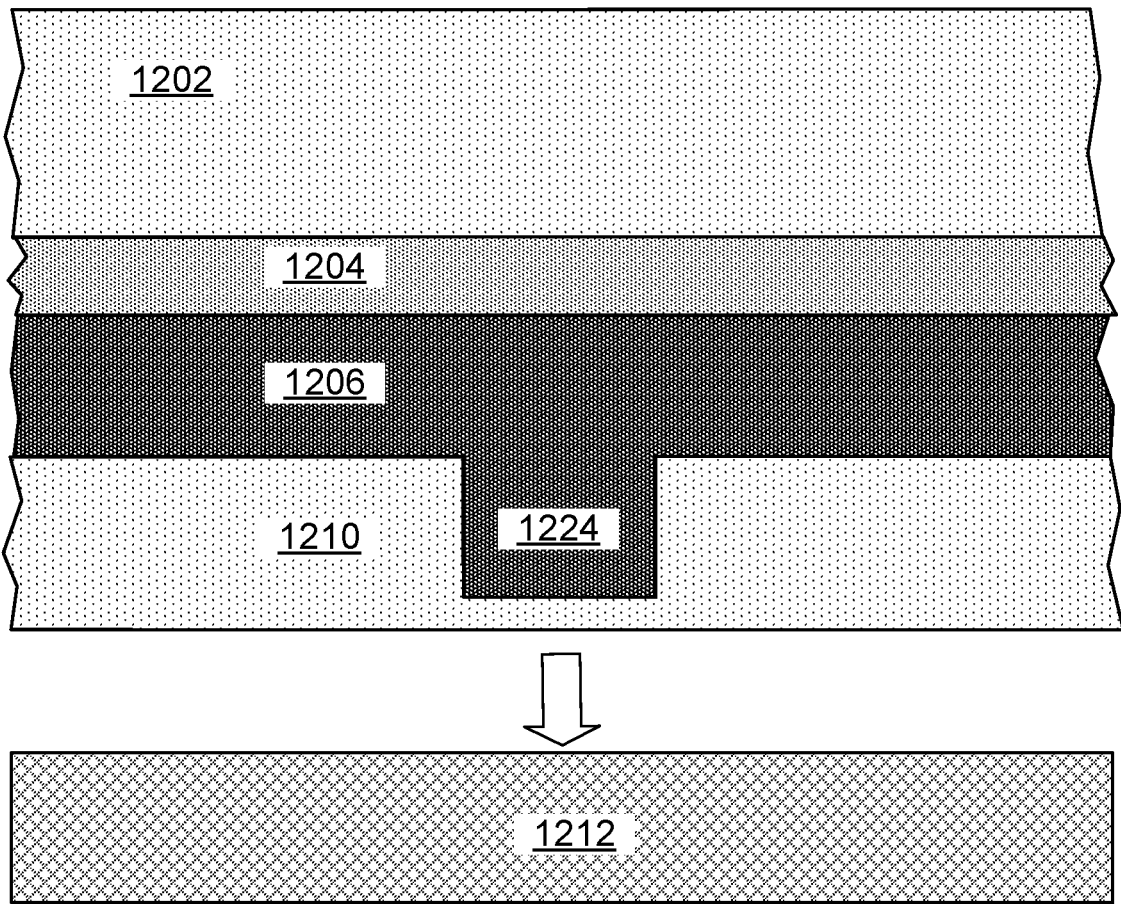

FIG. 12D illustrates bonding the planarized first cladding layer (1210) to a wafer (1212). In some embodiments, the upper surface of the first cladding layer may be bonded to the wafer. In some embodiments, the wafer (1212) comprises an optical interposer, or the wafer may be another type of circuit component of the device. In general, the wafer may contain any of a variety of different types of components that are to be configured proximate to the ridge waveguide.

Figure 12E:
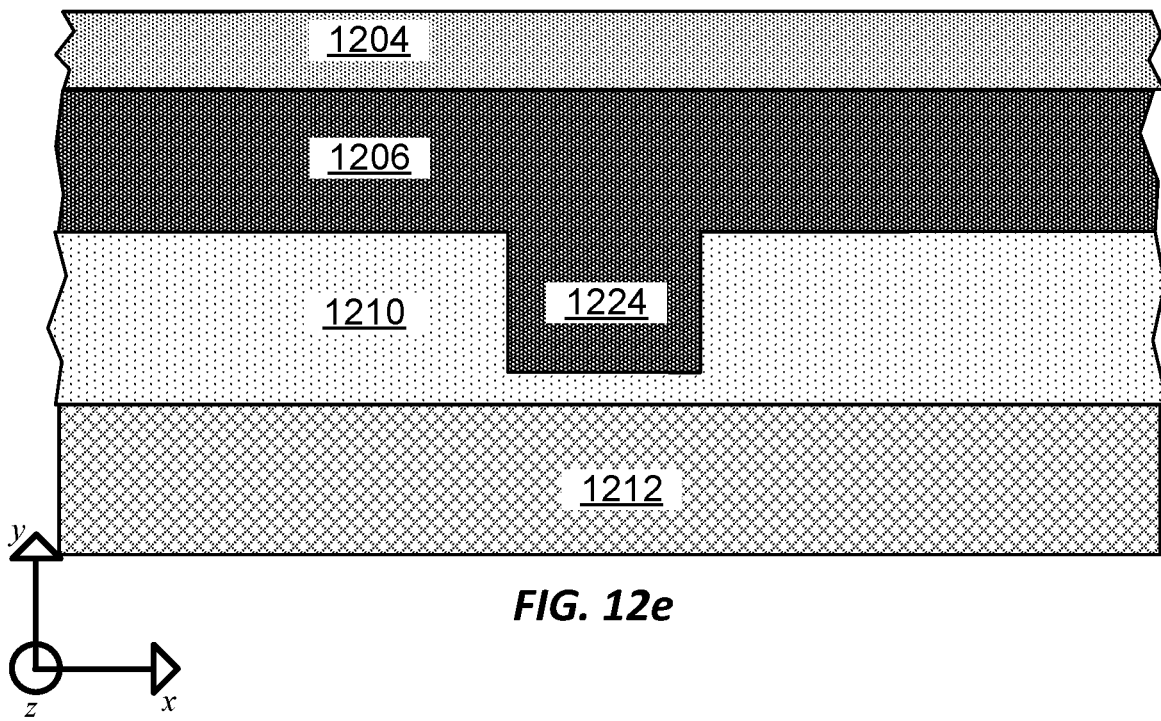

FIG. 12E illustrates removing the substrate layer (1202) from what is now shown as the upper surface of the device. Removing the substrate layer may expose the seed layer.

Figure 12F:
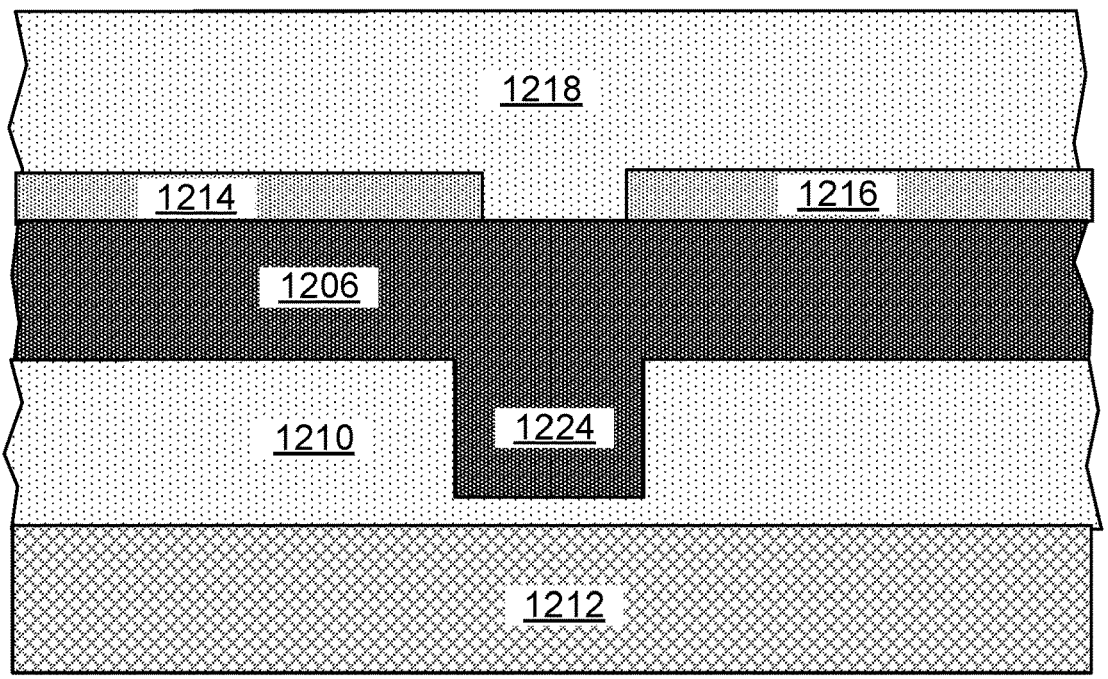

FIG. 12F illustrates etching the seed layer to split the seed layer into a first electrode (1214) separated from a second electrode (1216). Etching the seed layer may be performed to expose a portion of the electro-optic layer. The method may continue to deposit a second cladding layer (1218) on the etched seed layer and the exposed portion of the electro-optic layer.

Figure 12G:
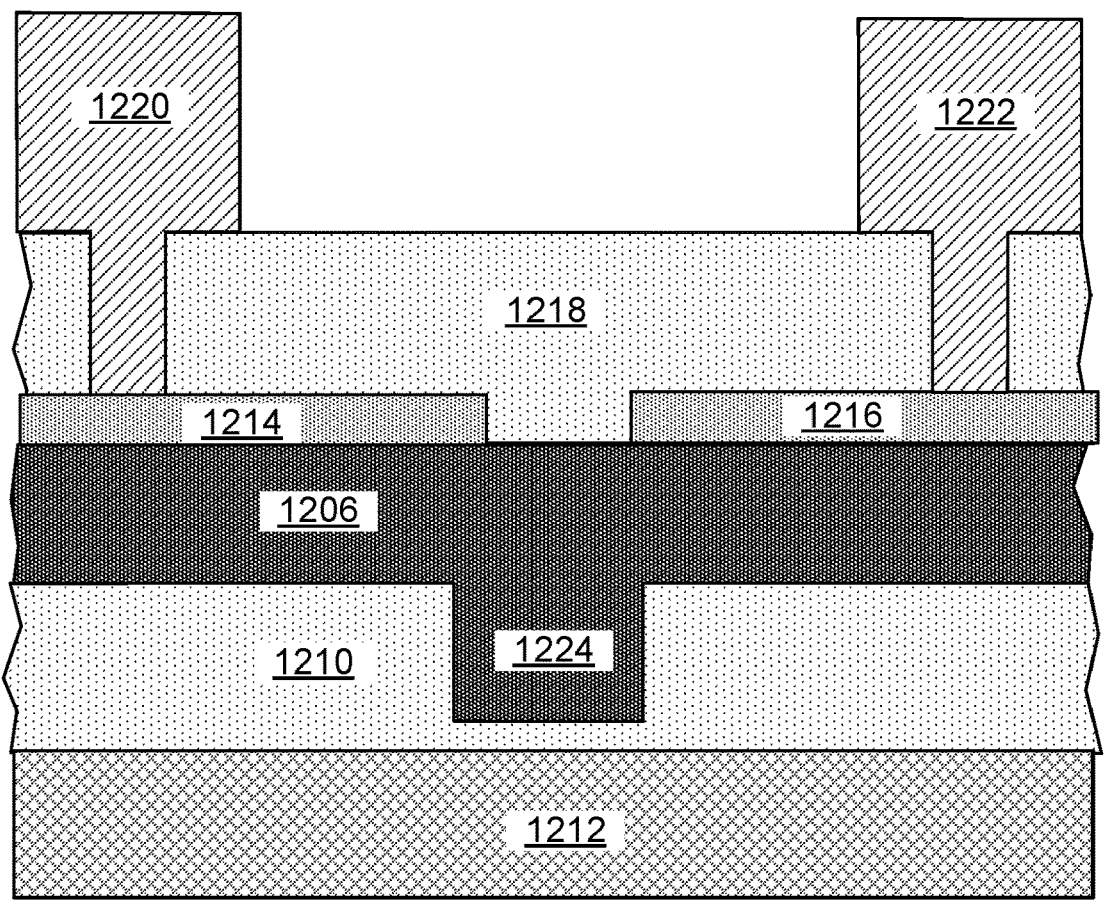

FIG. 12G illustrates etching the second cladding layer to expose a first portion of the first electrode, etching the second cladding layer to expose a second portion of the second electrode, depositing a first lead (1220) onto the first electrode (1214) through the exposed first portion, and depositing a second lead (1222) onto the second electrode (1216) through the exposed second portion. The first and second leads may be composed of a conductive material such as a metal (e.g., copper, gold, or the like), or alternatively they may be composed of a semiconductor. The final device may be structurally similar to the device illustrated in FIG. 2, for example.

FIGS. 13A-E are schematic diagrams illustrating a fabrication method for constructing the electro-optical device with a ridge waveguide positioned on the opposite side as the electrodes with leads penetrating through the slab layer of the waveguide, according to some embodiments. The method steps shown in FIGS. 13A-E may be used to construct a device similar to the device shown in FIG. 3, for example.

Figure 13A:
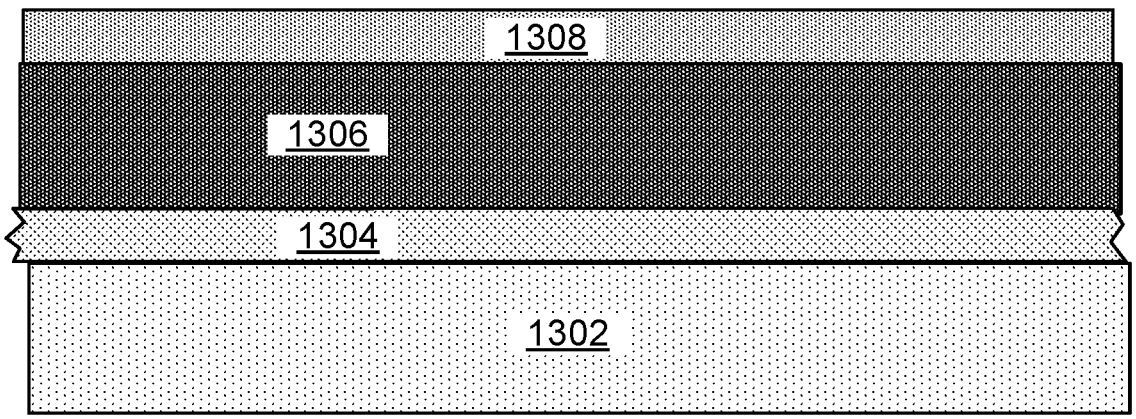
FIGS. 13A-E are schematic diagrams illustrating a fabrication method for constructing the electro-optical device with a ridge waveguide positioned on the opposite side as the electrodes with leads penetrating through the waveguide, according to some embodiments.

FIG. 13A illustrates initial steps for fabricating a device, including depositing a seed layer (1304) on a substrate layer (1302), depositing an electro-optic layer (1306) on the seed layer (1304), and depositing an electrode layer (1308) on the electro-optic layer (1306). The sequential layers may be epitaxially deposited, or they may be deposited using another technique. Alternatively, a completed wafer such as that shown in FIG. 13A may be received from a manufacturer. Alternatively, a partially completed wafer comprising one or more of the seed layer (1304), substrate layer (1302), and/or electro-optic layer (1306) may be received, and the remaining layers may be deposited to complete the wafer.

In some embodiments, the seed layer is composed of one of strontium titanate (STO), barium strontium titanate (BST), hafnium oxide, zirconium oxide, titanium oxide, graphene oxide, tantalum oxide, lead zirconium titanate (PZT), lead lanthanum zirconium titanate (PLZT), strontium barium niobate (SBN), magnesium oxide (MgO), germanium, or the like.

In some embodiments, the electro-optic layer is composed of one of barium titanate (BTO), barium strontium titanate (BST), lithium niobite, lead zirconium titanate (PZT), lead lanthanum zirconium titanate (PLZT), aluminum oxide, aluminum nitrite, or strontium barium niobate (SBN).

Figure 13B:
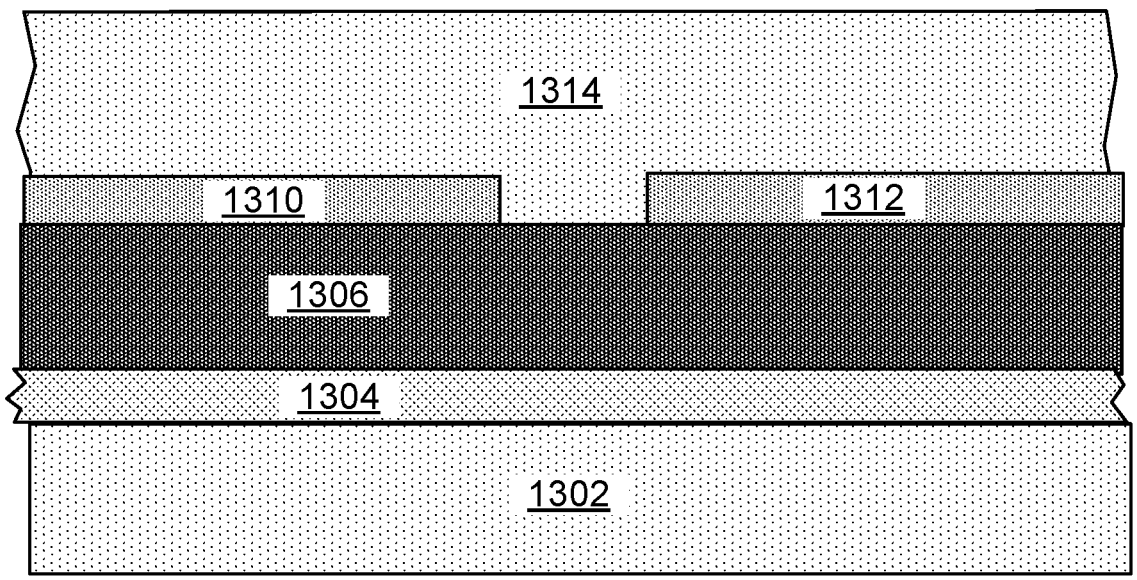

FIG. 13B illustrates etching the electrode layer (1308) to expose a portion of the electro-optic layer and split the electrode layer into a first electrode (1310) separated from a second electrode (1312). Subsequent to performing the etching, a first cladding layer (1314) is deposited on the exposed portion of the electro-optic layer and the first and second electrodes.

Figure 13C:
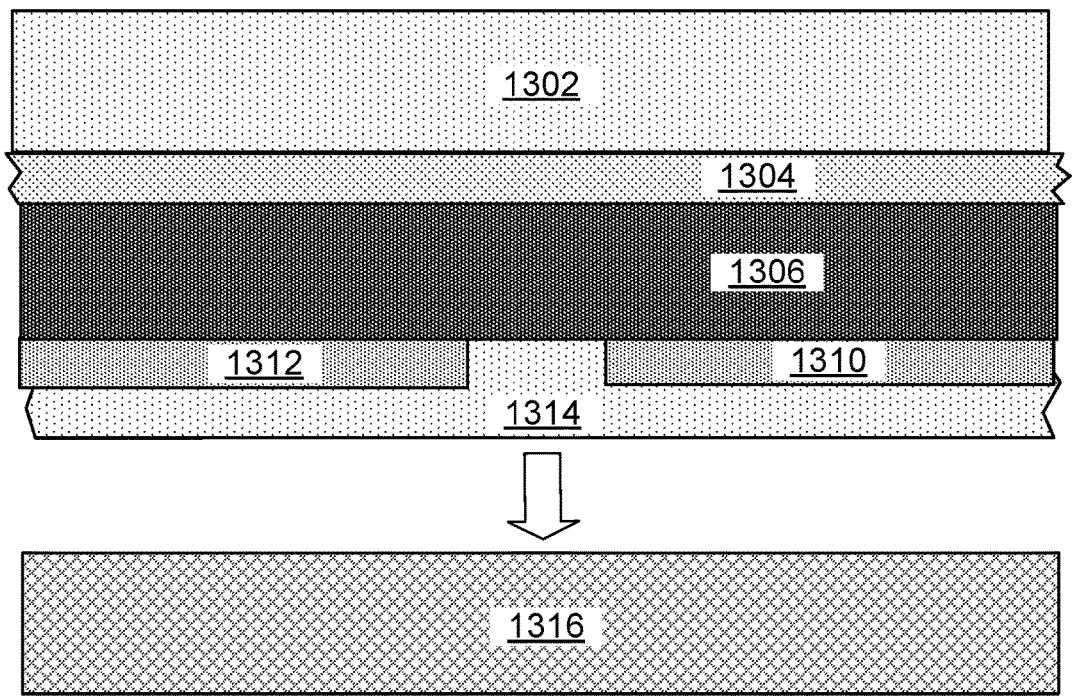

FIG. 13C illustrates planarizing the first cladding layer and bonding the planarized first cladding layer (1314) to a wafer (1316). For example, the first cladding layer may be planarized to increase its thickness uniformity and to improve bonding to the wafer. The device may be flipped upside down prior to bonding to the wafer, such that the planarized first cladding layer is now on the bottom of the device for bonding to the wafer. In some embodiments, the wafer (1316) comprises an optical interposer, or the wafer may be another type of circuit component of the device. In general, the wafer may contain any of a variety of different types of components that are to be configured proximate to the electrodes.

Figure 13D:
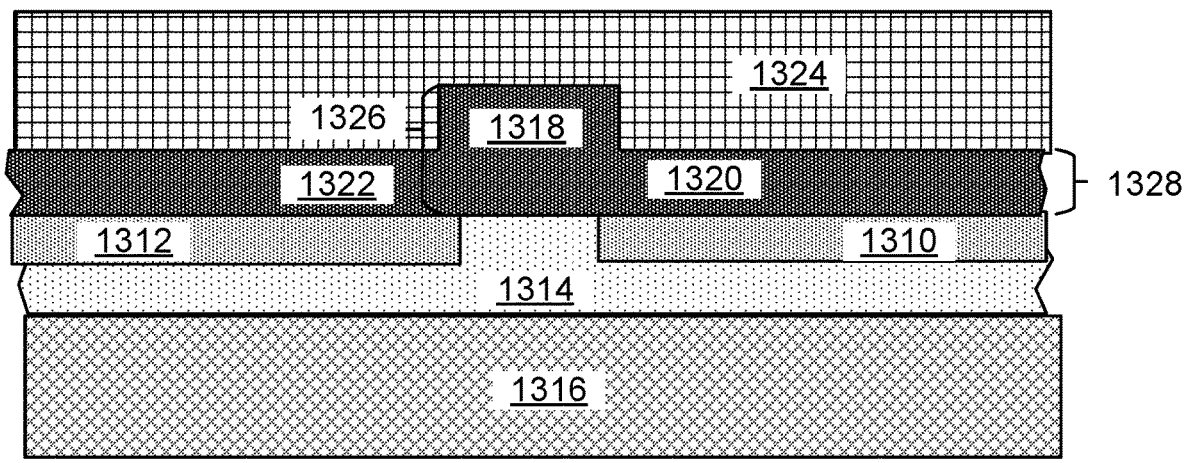

FIG. 13D illustrates removing the substrate layer (1302) and the seed layer (1304), and after removing the substrate layer and the seed layer, etching the electro-optic layer (1306) to produce a ridge waveguide (1318) with a first thickness (1326) disposed between first (1320) and second (1322) slab layers with a second thickness (1328) smaller than the first thickness (1326). In some embodiments, to further improve the electro-optic coefficient in the region near the ridge waveguide, not just the substrate layer (1302) and the seed layer (1304) are removed but a portion of the electro-optic layer 1306 is also removed to remove any c-axis electro-optic material that was grown in the region close to the seed layer (e.g., in the case of an STO seed and BTO electro-optic layer). After etching the ridge waveguide, a second cladding layer (1324) may be deposited on the first and second slab layers and the ridge waveguide structure.

Figure 13E:
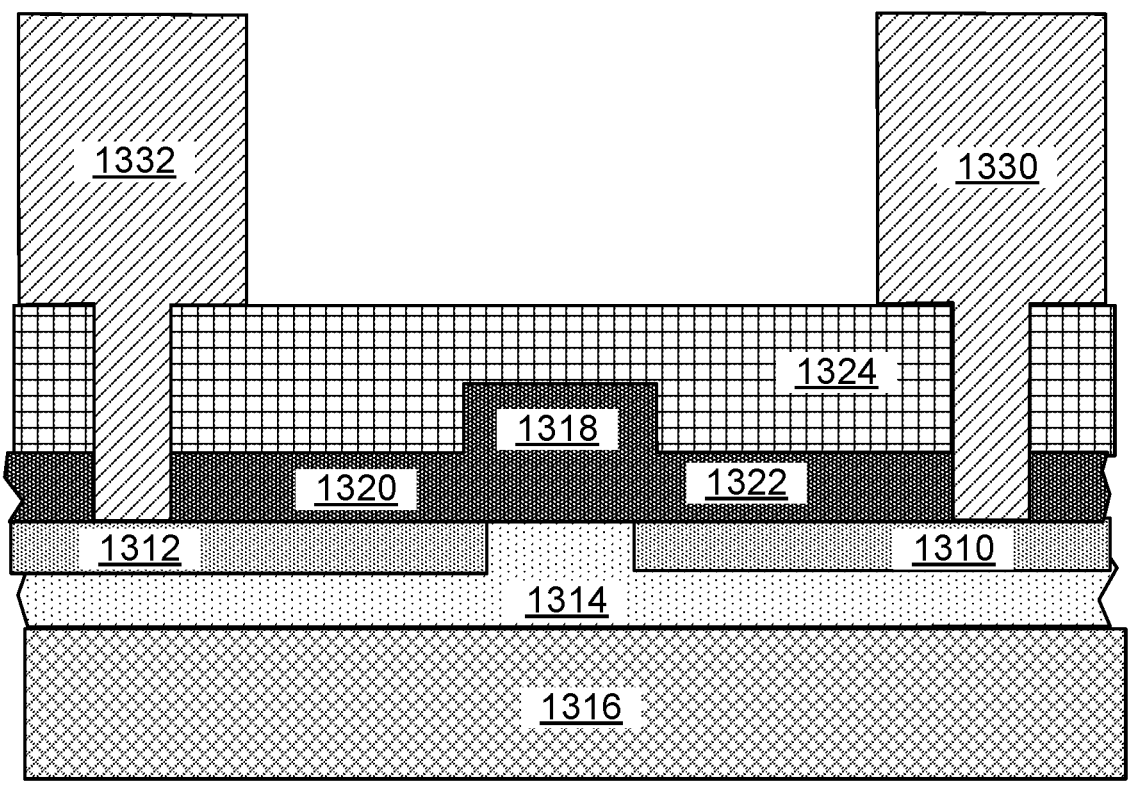

FIG. 13E illustrates etching through the second cladding layer (1324) and the first slab layer to expose a first portion of the first electrode, etching through the second cladding layer and the second slab layer to expose a second portion of the second electrode, depositing a first lead (1330) onto the first electrode (1310) through the exposed first portion, and depositing a second lead (1332) onto the second electrode (1312) through the exposed second portion. The first and second leads may be composed of a conductive material such as a metal, or alternatively they may be composed of a semiconductor.

FIGS. 14A-E are schematic diagrams illustrating a fabrication method for constructing the electro-optical device with a ridge waveguide positioned on the same side as the electrodes, according to some embodiments. The method steps shown in FIGS. 14A-E may be used to construct a device similar to the device shown in FIG. 4, for example.

Figure 14A:
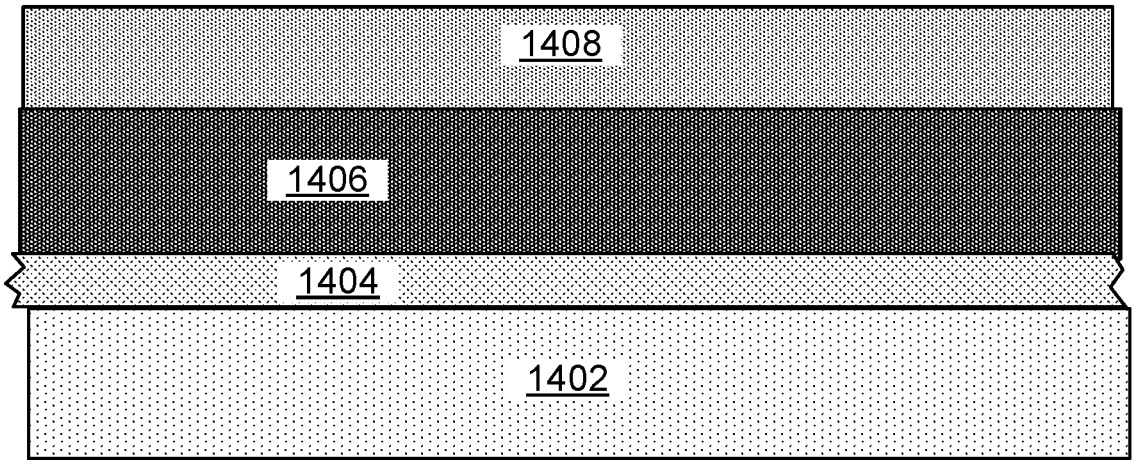
FIGS. 14A-E are schematic diagrams illustrating a fabrication method for constructing the electro-optical device with a ridge waveguide positioned on the same side as the electrodes, according to some embodiments.

FIG. 14A illustrates initial steps for fabricating a device, including depositing a seed layer (1404) on a substrate layer (1402), depositing an electro-optic layer (1406) on the seed layer (1404), and depositing a first cladding layer (1408) on the electro-optic layer (1406). The sequential layers may be epitaxially deposited, or they may be deposited using another technique. Alternatively, a completed wafer such as that shown in FIG. 14A may be received from a manufacturer. Alternatively, a partially completed wafer comprising one or more of the seed layer (1404), substrate layer (1402), electro-optic layer (1406), and/or first cladding layer (1408) may be received, and the remaining layers may be deposited to complete the wafer.

In some embodiments, the electro-optic layer is composed of one of barium titanate (BTO), barium strontium titanate (BST), lithium niobite, lead zirconium titanate (PZT), lead lanthanum zirconium titanate (PLZT), aluminum oxide, aluminum nitrite, or strontium barium niobate (SBN).

Figure 14B:
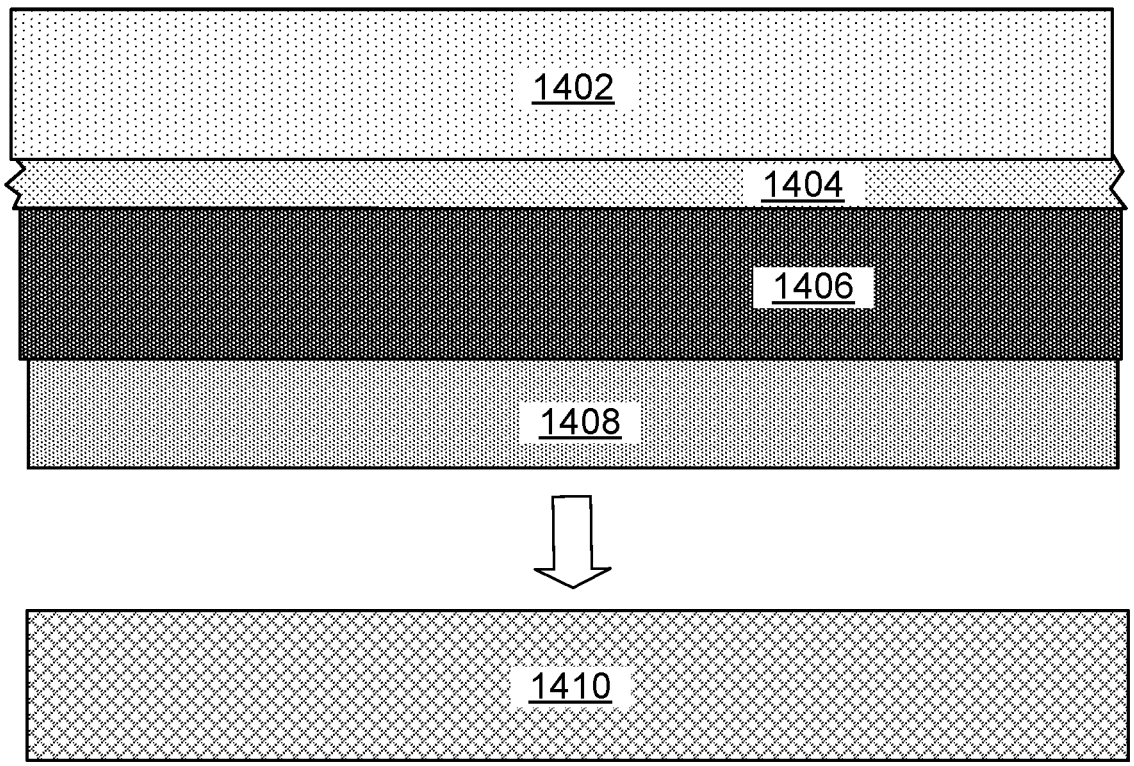

FIG. 14B illustrates planarizing the first cladding layer (1408) to increase thickness uniformity of the first cladding layer, and bonding the planarized first cladding layer (1408) to a wafer (1410). The device may be flipped upside down prior to bonding to the wafer, such that the planarized first cladding layer is now on the bottom of the device for bonding to the wafer. In some embodiments, the wafer (1410) comprises an optical interposer, or the wafer may be another type of circuit component of the device. In general, the wafer may contain any of a variety of different types of components that are to be configured proximate to the seed layer.

Figure 14C:
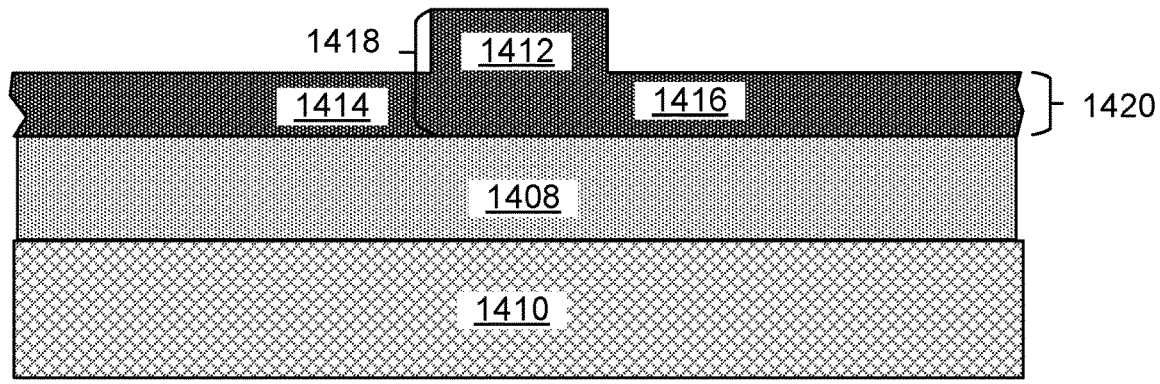

FIG. 14C illustrates removing the substrate layer (1402) and the seed layer (1404), and after removing the substrate layer and the seed layer, etching the electro-optic layer to produce a ridge waveguide (1412) with a first thickness (1418) disposed between a first slab layer (1414) and a second slab layer (1416), wherein the first and second slab layers have a second thickness (1420) smaller than the first thickness (1418). In some embodiments, to further improve the electro-optic coefficient in the region near the ridge waveguide, not just the substrate layer (1402) and the seed layer (1404) are removed but a portion of the electro-optic layer 1406 is also removed to remove any c-axis electro-optic material that was grown in the region close to the seed layer (e.g., in the case of an STO seed and BTO electro-optic layer).

Figure 14D:
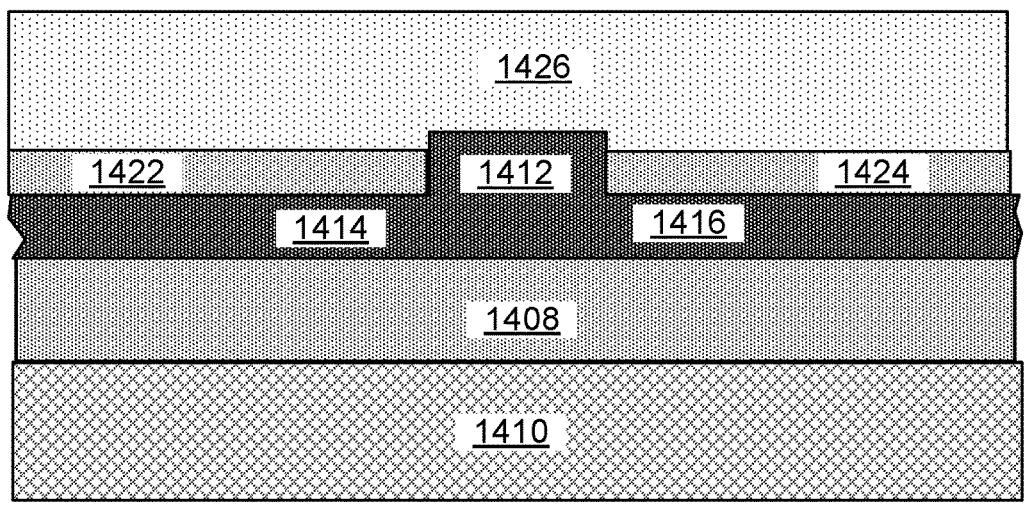

FIG. 14D illustrates depositing a first (1422) and second (1424) electrode on the left and right sides, respectively, of the ridge waveguide structure (1412), and depositing a second cladding layer (1426) on the first and second electrodes and the ridge waveguide structure. In some embodiments, the first and second electrodes are composed of one of strontium titanate (STO), barium strontium titanate (BST), hafnium oxide, zirconium oxide, titanium oxide, graphene oxide, tantalum oxide, lead zirconium titanate (PZT), lead lanthanum zirconium titanate (PLZT), or strontium barium niobate (SBN).

Figure 14E:
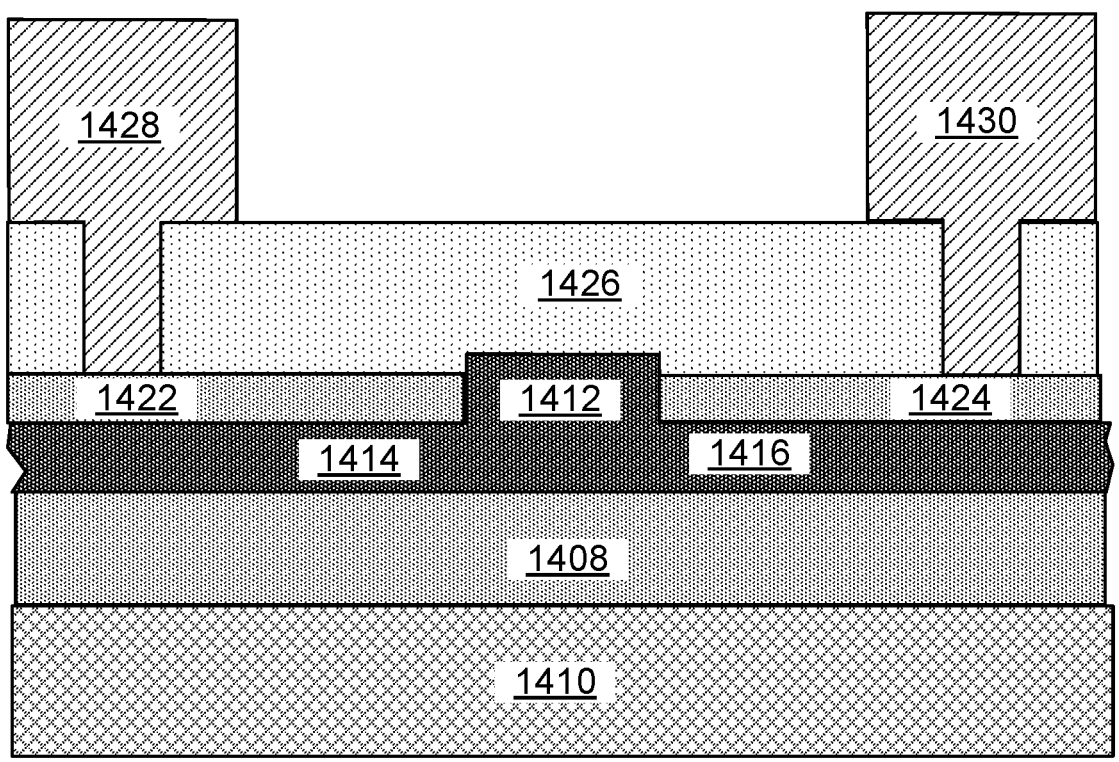

FIG. 14E illustrates etching through the second cladding layer to expose a first portion of the first electrode, etching through the second cladding layer to expose a second portion of the second electrode, depositing a first lead (1428) onto the first electrode (1422) through the exposed first portion, and depositing a second lead (1430) onto the second electrode (1424) through the exposed second portion. The first and second leads may be composed of a conductive material such as a metal, or alternatively they may be composed of a semiconductor.

FIG. 15A-E illustrate methods for fabricating a photonic device exhibiting a sandwich architecture, according to some embodiments. The method steps shown in FIGS. 15A-E may be used to construct a device similar to the device shown in FIG. 5, for example.

Figure 15A:
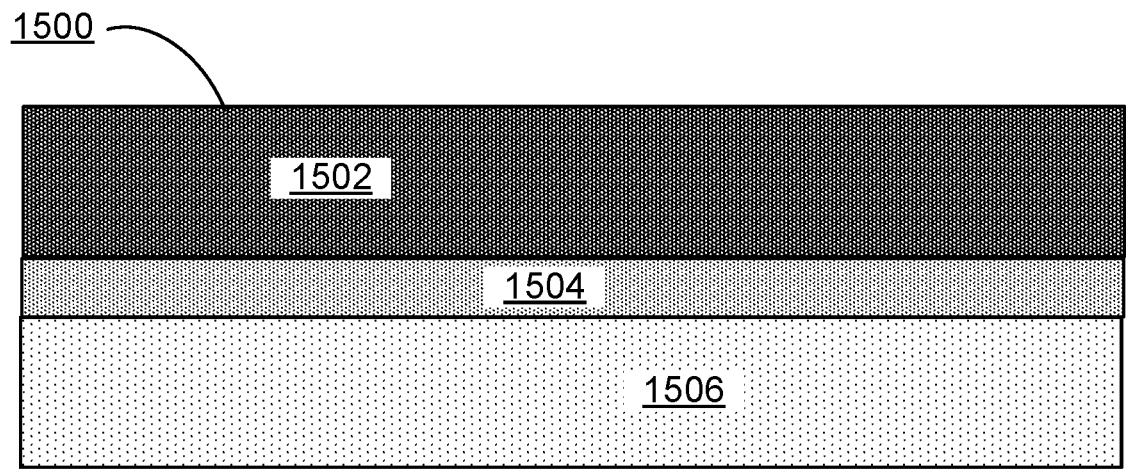
FIG. 15A-E are schematic diagrams illustrating a fabrication method for constructing a photonic device exhibiting a sandwich architecture, according to some embodiments.

FIG. 15A illustrates a cross section of a first wafer (1500) comprising an electrode layer (1504) disposed on a first substrate layer (1506) and an electro-optic layer (1502) disposed on the electrode layer (1504). Alternatively, in some embodiments the electro-optic layer (1502) is disposed on a seed layer (not shown). The first wafer may be prefabricated by a wafer manufacturer and received for further fabrication steps as described in FIGS. 15C-E, in some embodiments. Alternatively, the first wafer may be fabricated in-house. For example, the electrode layer and the electro-optic layer may be sequentially deposited on the first substrate layer, by utilizing epitaxial deposition or any of a variety of other deposition techniques, as variously described throughout this disclosure.

Figure 15B:
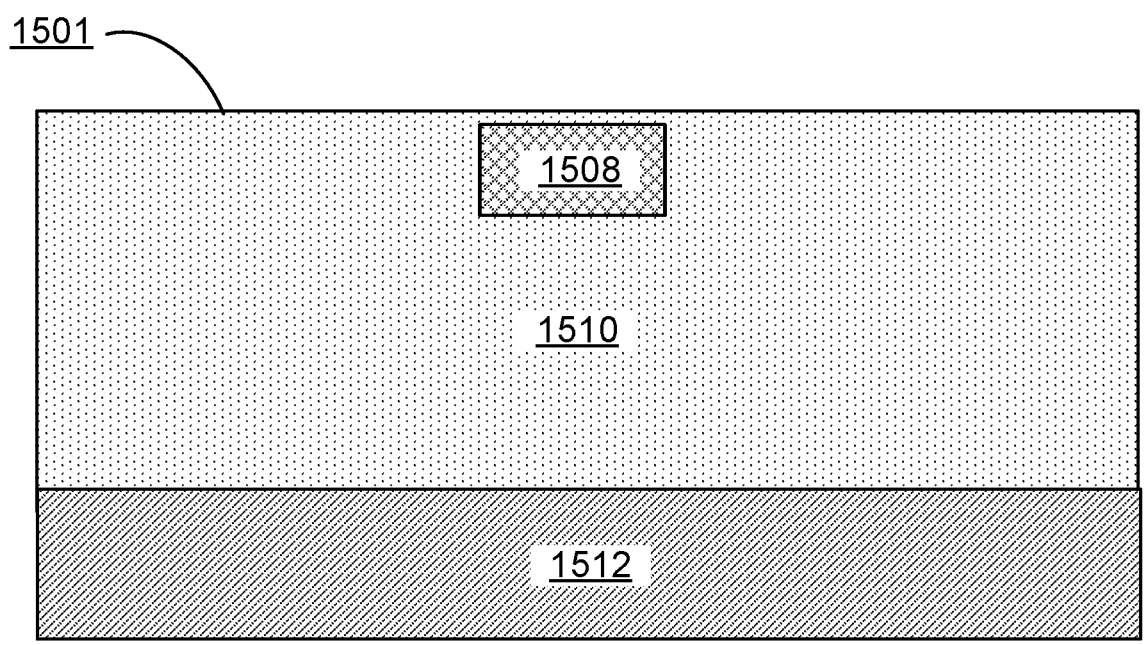

FIG. 15B illustrates a cross section of a second wafer (1501) comprising a second substrate layer (1512) disposed underneath a second cladding layer (1510) and a second strip waveguide structure (1508) disposed within the second cladding layer and near the upper surface of the second cladding layer. The second wafer (1501) may be prefabricated by a wafer manufacturer and received for further fabrication steps as described in FIGS. 15C-E, in some embodiments. Alternatively, the second wafer may be fabricated in-house, as desired.

In some embodiments, the first wafer (1500) is flipped over, and the exposed surface of the electro-optic layer (1502) of the first wafer is bonded to exposed surface of the second cladding layer (1510) of the second wafer. Accordingly, the first and second wafers are bonded together.

Figure 15C:
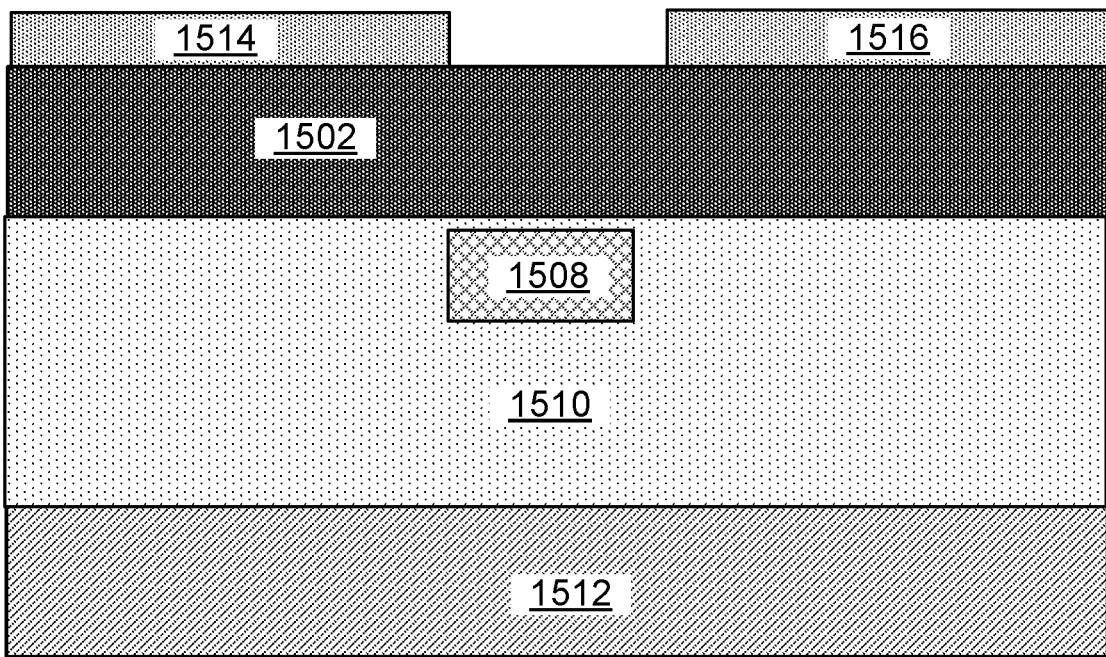

FIG. 15C illustrates how, in some embodiments, after bonding the first wafer to the second wafer, the first cladding layer (1506) is removed, and the electrode layer (1504) is etched to split the electrode layer into a first electrode (1514) separated from a second electrode (1516). In other embodiments, the electrode layer (1504) serves as a relatively thin seed layer that is ultimately removed. To further improve the electro-optic coefficient in the region near the surface of the seed layer, a portion of the electro-optic layer (1502) may be removed in addition to the substrate layer (1506) and the electrode/seed layer (1504). In these embodiments, after this removal of the seed layer, or any partial removal step, a new electrode layer may be deposited and etched as described above.

Figure 15D:
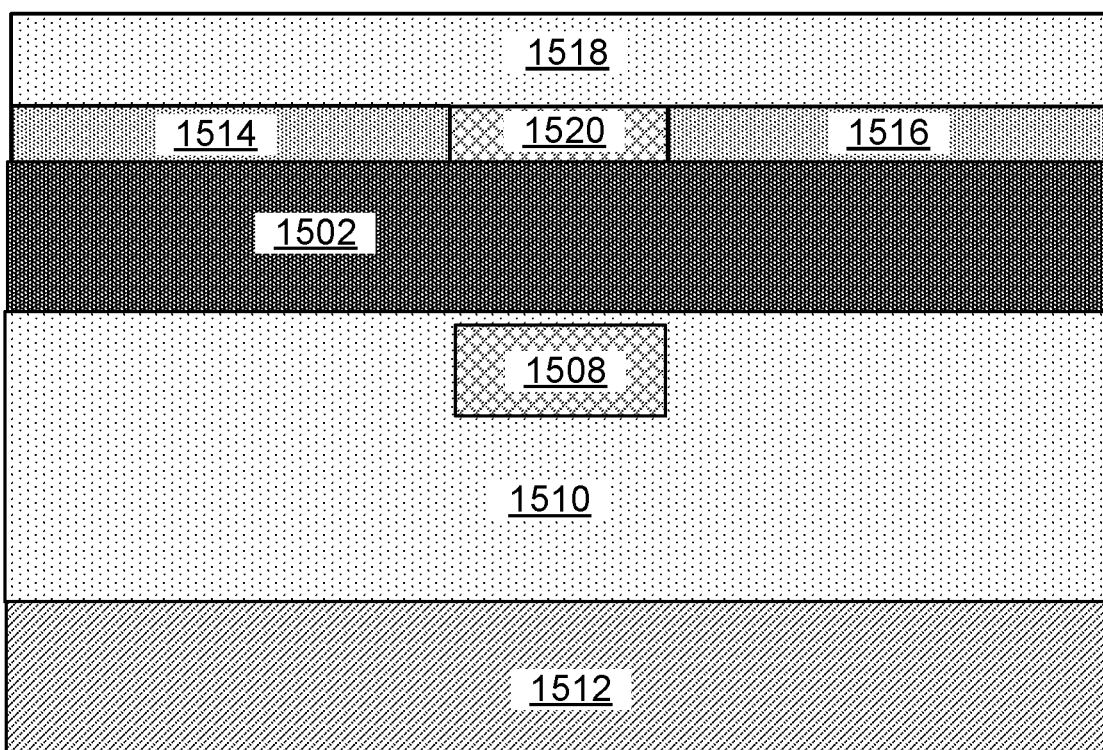

FIG. 15D illustrates how a first strip waveguide structure (1520) is deposited between the first (1514) and second (1516) electrodes. In some embodiments, the deposition process is followed by a planarization step to remove excess material from the region above the electrodes, e.g., by way of lithographic patterning or chemical mechanical polishing (CMP). In some embodiments, the material used for the strip waveguide structures (1520) and/or (1508) is as described above in reference to FIG. 5, and may be, e.g., silicon nitride. Subsequently, a first cladding layer (1518) is deposited on the first and second electrodes and the first strip waveguide structure.

Figure 15E:
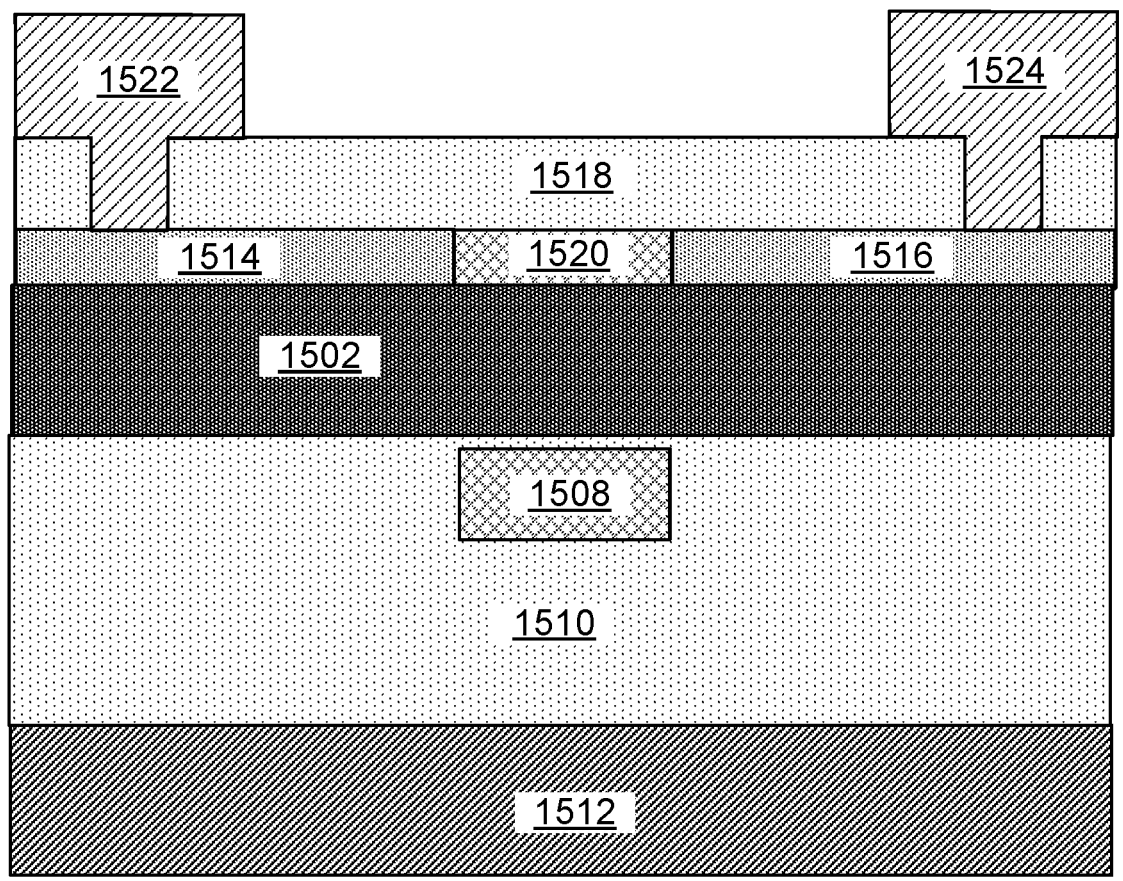

Finally, FIG. 15E illustrates how the first cladding layer (1518) is etched to expose a portion of the first electrode (1514) and a portion of the second electrode (1516). A first lead (1522) is then deposited on the exposed portion of the first electrode, and a second lead (1524) is deposited on an exposed portion of the second electrode. FIG. 15E illustrates an embodiment where the lead is deposited on the upper surface of the first and second electrodes. However, in other embodiments, the exposed portions of the first and second electrodes may themselves be etched, such that the first and second leads are deposited within some distance within the cross section of the first and second electrodes, or potentially on the upper surface of the electro-optic layer (1502).

Figure 16:
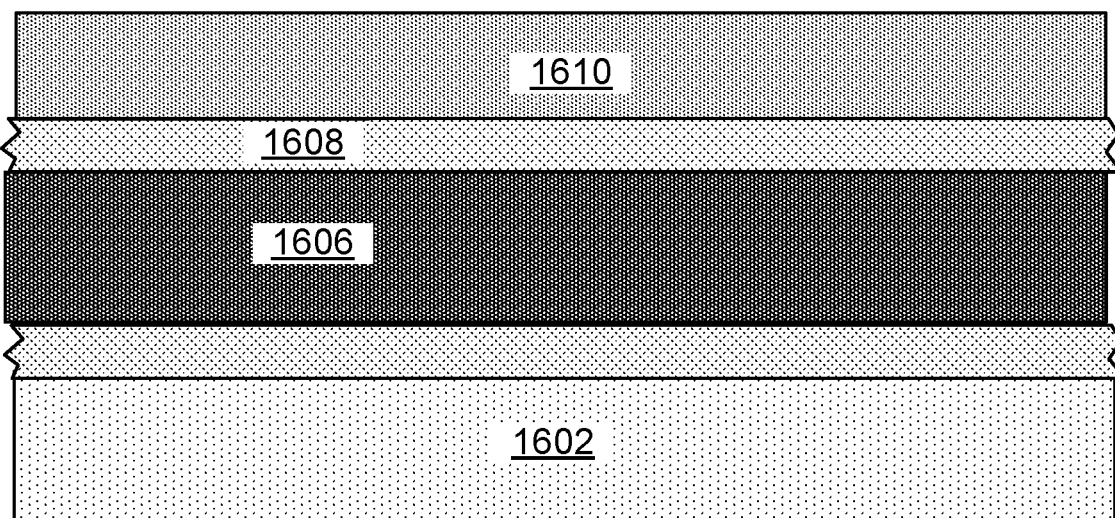
FIG. 16 is a schematic diagram of a pre-fabricated wafer comprising stacked layers, according to some embodiments.

FIG. 16 illustrates a cross section of a first wafer including a layer stack that may be received as part of a fabrication process for various devices described herein, according to various embodiments. As illustrated, a first insulating substrate layer (1502) may be (optionally) disposed beneath a seed layer (1504), which is disposed beneath an electro-optic layer (1506), which is (optionally) disposed beneath an electrode layer (1508), which is (optionally) disposed beneath a second insulating substrate layer (1510). It is noted that the first wafer may be of various types depending on the specific fabrication method to be employed, as the seed layer, electrode layer, and second substrate layer may be optionally present or not present, as desired.

In some embodiments, the seed layer (1504) may be subsequently etched to form a first electrode separated from a second electrode. Alternatively, in some embodiments the seed layer simply serves to provide an interworking layer between the electro-optic layer and the first substrate layer, and the seed layer is ultimately removed during the fabrication process. In these embodiments, the electrode layer (1508) may be etched to form the first and second electrodes.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for constructing a device, the method comprising:
   receiving a first wafer comprising a first layer stack, wherein the first layer stack comprises:
      a substrate layer;
      a seed layer disposed on the substrate layer; and
      an electro-optic layer disposed on the seed layer;
   etching the electro-optic layer to produce a ridge waveguide structure with a first thickness disposed between first and second slab layers of the electro-optic layer with a second thickness smaller than the first thickness;
   receiving a second wafer; and
   after etching the electro-optic layer:
      bonding the first layer stack to the second wafer;
      removing the substrate layer;
      etching the seed layer to form, in the seed layer, a first electrode separated from a second electrode; and
      depositing a second cladding layer on the first electrode and the second electrode.

2. The method of claim 1, further comprising:
   depositing a first cladding layer on the electro-optic layer after etching the electro-optic layer, wherein bonding the first layer stack to the second wafer comprises bonding a surface of the first cladding layer to the second wafer.

3. The method of claim 2, further comprising:
prior to bonding the surface of the first cladding layer to the second wafer, planarizing the first cladding layer.

4. The method of claim 1, the method further comprising:
etching the second cladding layer to expose a first portion of the first electrode;
etching the second cladding layer to expose a second portion of the second electrode;
depositing a first lead onto the first electrode through the exposed first portion; and
depositing a second lead onto the second electrode through the exposed second portion.

5. The method of claim 1,
wherein the first thickness is between 200 and 350 nanometers (nm), and
wherein the second thickness is less than 150 nm.

6. The method of claim 5,
wherein the substrate layer comprises a silicon-on-insulator (SOI) wafer, and
wherein a silicon layer of the SOI wafer is in contact with the seed layer.

7. The method of claim 1,
wherein the second wafer comprises an optical interposer.

8. The method of claim 1,
wherein seed layer is composed of one of:
strontium titanate;
barium strontium titanate;
hafnium oxide;
zirconium oxide;
titanium oxide;
graphene oxide;
tantalum oxide;
lead zirconium titanate;
lead lanthanum zirconium titanate;
magnesium oxide;
germanium; or
strontium barium niobate, and
wherein the electro-optic layer is composed of one of:
barium titanate;
barium strontium titanate;
lithium niobite;
lead zirconium titanate;
lead lanthanum zirconium titanate;
aluminum oxide;
aluminum nitrite; or
strontium barium niobate.

9. A method for constructing a device, the method comprising:
receiving a first wafer comprising a first layer stack, wherein the first layer stack comprises:
a seed layer disposed on a substrate layer;
an electro-optic layer disposed on the seed layer; and
an electrode layer disposed on the electro-optic layer;
etching the electrode layer to expose a portion of the electro-optic layer and split the electrode layer into a first electrode separated from a second electrode;
depositing a first cladding layer on the exposed portion of the electro-optic layer and the first and second electrodes;
bonding a surface of the first cladding layer to a second wafer;
removing the substrate layer and the seed layer;
after removing the substrate layer and the seed layer, etching the electro-optic layer to produce a ridge waveguide with a first thickness disposed between first and second slab layers with a second thickness smaller than the first thickness; and
depositing a second cladding layer on the first and second slab layers and the ridge waveguide structure.

10. The method of claim 9, the method further comprising:
prior to bonding the first cladding layer to the second wafer, planarizing the first cladding layer.

11. The method of claim 9, the method further comprising:
etching through the second cladding layer and the first slab layer to expose a first portion of the first electrode;
etching through the second cladding layer and the second slab layer to expose a second portion of the second electrode;
depositing a first lead onto the first electrode through the exposed first portion; and
depositing a second lead onto the second electrode through the exposed second portion.

12. The method of claim 9, further comprising:
wherein the substrate layer comprises a silicon-on-insulator (SOI) wafer, and
wherein a silicon layer of the SOI wafer is in contact with the seed layer.

13. The method of claim 9,
wherein the second wafer comprises an optical interposer.

14. The method of claim 9,
wherein seed layer is composed of one of:
strontium titanate;
barium strontium titanate;
hafnium oxide;
zirconium oxide;
titanium oxide;
graphene oxide;
tantalum oxide;
lead zirconium titanate;
lead lanthanum zirconium titanate;
magnesium oxide;
germanium; or
strontium barium niobate, and
wherein the electro-optic layer is composed of one of:
barium titanate;
barium strontium titanate;
lithium niobite;
lead zirconium titanate;
lead lanthanum zirconium titanate;
aluminum oxide;
aluminum nitrite; or
strontium barium niobate.

15. A method for constructing a device, the method comprising:
receiving a first wafer comprising a first layer stack, wherein the first layer stack comprises:
a seed layer disposed on a substrate layer;
an electro-optic layer disposed on the seed layer; and
a first cladding layer disposed on the electro-optic layer;
bonding the first cladding layer to a second wafer;
removing the substrate layer and the seed layer;
after removing the substrate layer and the seed layer, etching the electro-optic layer to produce a ridge waveguide with a first thickness disposed between a first slab layer and a second slab layer, wherein the first and second slab layers have a second thickness smaller than the first thickness;

depositing a first and second electrode on left and right sides, respectively, of the ridge waveguide structure; and depositing a second cladding layer on the first and second electrodes and the ridge waveguide structure.

16. The method of claim 15, the method further comprising:
prior to bonding the first cladding layer to the second wafer, planarizing the first cladding layer.

17. The method of claim 16,
wherein seed layer is composed of one of:
strontium titanate;
barium strontium titanate;
hafnium oxide;
zirconium oxide;
titanium oxide;
graphene oxide;
tantalum oxide;
lead zirconium titanate;
lead lanthanum zirconium titanate;
magnesium oxide;
germanium; or
strontium barium niobate, and
wherein the electro-optic layer is composed of one of:
barium titanate;
barium strontium titanate;
lithium niobite;
lead zirconium titanate;
lead lanthanum zirconium titanate;
aluminum oxide;
aluminum nitrite; or
strontium barium niobate.

18. The method of claim 15, the method further comprising:
etching through the second cladding layer to expose a first portion of the first electrode;
etching through the second cladding layer to expose a second portion of the second electrode;
depositing a first lead onto the first electrode through the exposed first portion; and
depositing a second lead onto the second electrode through the exposed second portion.

19. The method of claim 15,
wherein the substrate layer comprises a silicon-on-insulator (SOI) wafer, the method further comprising:
oxidizing a top silicon layer of the SOI wafer in contact with the seed layer.

20. The method of claim 15,
wherein the second wafer comprises an optical interposer.

* * * * *